US008790618B2

(12) United States Patent
Adams et al.

(10) Patent No.: US 8,790,618 B2
(45) Date of Patent: Jul. 29, 2014

(54) SYSTEMS AND METHODS FOR INITIATING OPERATION OF PRESSURE SWING ADSORPTION SYSTEMS AND HYDROGEN-PRODUCING FUEL PROCESSING SYSTEMS INCORPORATING THE SAME

(75) Inventors: Patton M. Adams, Longview, TX (US); James A. Givens, Bend, OR (US); Arne LaVen, Bend, OR (US); Sudha Rani LaVen, Bend, OR (US); Curtiss Renn, Bend, OR (US)

(73) Assignee: DCNS SA, La Montagne (FR)

( * ) Notice: Subject to any disclaimer, the term of this patent is extended or adjusted under 35 U.S.C. 154(b) by 627 days.

(21) Appl. No.: 12/963,530

(22) Filed: Dec. 8, 2010

(65) Prior Publication Data
US 2011/0150756 A1 Jun. 23, 2011

Related U.S. Application Data
(60) Provisional application No. 61/287,601, filed on Dec. 17, 2009.

(51) Int. Cl.
*C01B 3/02* (2006.01)
*C10J 3/00* (2006.01)
(52) U.S. Cl.
USPC .......................... 423/652; 48/197 R; 252/373
(58) Field of Classification Search
USPC ............ 423/652; 95/8; 48/61, 197 R; 429/34, 429/19; 252/373
See application file for complete search history.

(56) References Cited

U.S. PATENT DOCUMENTS

| 2,824,620 | A | 2/1958 | De Rosset |
| 3,336,730 | A | 8/1967 | McBride et al, |
| 3,338,681 | A | 8/1967 | Kordesch |
| 3,350,176 | A | 10/1967 | Green et al. |
| 3,469,944 | A | 9/1969 | Bocard et al. |
| 3,522,019 | A | 7/1970 | Buswell et al. |
| 3,655,448 | A | 4/1972 | Setzer |
| 4,098,959 | A | 7/1978 | Fanciullo |
| 4,098,960 | A | 7/1978 | Gagnon |
| 4,175,165 | A | 11/1979 | Adlhart |
| 4,214,969 | A | 7/1980 | Lawrance |
| 4,468,235 | A | 8/1984 | Hill |
| 5,401,589 | A | 3/1995 | Palmer et al. |

(Continued)

OTHER PUBLICATIONS

International Search Report and Written Opinion for PCT Patent Application Serial No. PCT/US10/59752, dated Feb. 7, 2011.

*Primary Examiner* — Stanley Silverman
*Assistant Examiner* — Syed Iqbal
(74) *Attorney, Agent, or Firm* — Dascenzo Intellectual Property Law, P.C.

(57) ABSTRACT

Pressure swing adsorption (PSA) assemblies with optimized startup times, as well as to hydrogen-generation assemblies and/or fuel cell systems containing the same, and methods of operating the same. Startup and shutdown methods for a PSA assembly, and optionally an associated fuel processing system, are disclosed to provide for shortened startup times. The PSA assemblies may be in fluid communication with a hydrogen source that may be used or otherwise configured or controlled to purge the PSA adsorbent columns of adsorbents during startup and/or shutdown procedures, the hydrogen source additionally or alternatively may be used or otherwise configured or controlled to charge the columns with hydrogen for idling in a pressurized state. The use of this hydrogen source, together with specific startup and shutdown methodologies, provides for reducing the startup time of the PSA assembly.

17 Claims, 6 Drawing Sheets

(56) References Cited

U.S. PATENT DOCUMENTS

| | | |
|---|---|---|
| 5,432,710 A | 7/1995 | Ishimaru et al. |
| 5,637,414 A | 6/1997 | Inoue et al. |
| 5,733,359 A * | 3/1998 | Doong et al. ............... 95/8 |
| 5,861,137 A | 1/1999 | Edlund |
| 5,997,594 A | 12/1999 | Edlund et al. |
| 6,083,637 A | 7/2000 | Walz et al. |
| 6,221,117 B1 | 4/2001 | Edlund et al. |
| 6,319,306 B1 | 11/2001 | Edlund et al. |
| 6,376,113 B1 | 4/2002 | Edlund et al. |
| 6,383,670 B1 | 5/2002 | Edlund et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 6,921,597 B2 | 7/2005 | Keefer et al. |
| 2003/0157390 A1* | 8/2003 | Keefer et al. .................. 429/34 |
| 2005/0188614 A1* | 9/2005 | Mirkovic et al. ............... 48/61 |
| 2006/0088468 A1 | 4/2006 | Sumi et al. |
| 2006/0177372 A1* | 8/2006 | Doshi ........................ 423/652 |
| 2007/0237994 A1* | 10/2007 | Nakai et al. .................... 429/19 |
| 2008/0289255 A1* | 11/2008 | Wheat et al. ............... 48/197 R |

* cited by examiner

SYSTEMS AND METHODS FOR INITIATING OPERATION OF PRESSURE SWING ADSORPTION SYSTEMS AND HYDROGEN-PRODUCING FUEL PROCESSING SYSTEMS INCORPORATING THE SAME

RELATED APPLICATION

The present application claims priority to similarly entitled U.S. Provisional Patent Application Ser. No. 61/287,601, which was filed on Dec. 17, 2009 and the complete disclosure of which is hereby incorporated by reference.

FIELD OF THE DISCLOSURE

The present disclosure is directed generally to pressure swing adsorption systems and hydrogen-generation and/or fuel cell systems incorporating the same, and more particularly to such systems and to methods that reduce the startup time of pressure swing adsorption systems.

BACKGROUND OF THE DISCLOSURE

A hydrogen-generation assembly is an assembly that converts one or more feedstocks into a product stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electrical potential, which also may be referred to as electricity, an electric current, and/or the electrical output of the fuel cell. In such fuel cells, the hydrogen is the fuel, the oxygen is the oxidant, and the water is the reaction product. Fuel cells typically require high purity hydrogen gas to prevent the fuel cells from being damaged during use. The product stream from a hydrogen-generation assembly may contain impurities, illustrative, non-exclusive examples of which include one or more of carbon monoxide, carbon dioxide, methane, unreacted feedstock, and water. Therefore, there is a need in many conventional fuel cell systems to include suitable structure for removing impurities from the product hydrogen stream.

A pressure swing adsorption (PSA) process is an illustrative, non-exclusive example of a mechanism that may be used to remove impurities from an impure hydrogen gas stream by selective adsorption of one or more of the impurities present in the impure hydrogen stream, The adsorbed impurities can be subsequently desorbed and removed from the PSA assembly. PSA is a pressure-driven separation process that utilizes a plurality of adsorbent beds. The beds are cycled through a series of steps, such as one or more pressurization, separation (adsorption), equalization, depressurization (desorption), and/or purge steps to selectively remove impurities from the hydrogen gas and then desorb the impurities.

An energy-producing assembly is a combination of a hydrogen-generation assembly, PSA assembly, fuel cell, and related system components. Energy-producing assemblies are used to produce some form of usable energy, such as electrical or thermal energy. In some applications, there may be a need to take the energy-producing assembly from a dormant state, in which it is not producing energy, to an energy-producing state as quickly as possible. As an illustrative, non-exclusive example, in situations where the energy-producing assembly is used to supply backup power to an energy-consuming device when the primary power source becomes unavailable, reducing the startup time of the energy-producing assembly may be critical to ensuring the continued operation of the energy-consuming device. Reducing the startup time of the energy-producing assembly may include optimizing the startup characteristics and methods for each individual component of the assembly. This disclosure relates to methods for optimizing the startup time of a PSA assembly in such a system, and to hydrogen-producing fuel processing and fuel cell systems containing such a PSA assembly.

SUMMARY OF THE DISCLOSURE

The present disclosure is directed to systems for optimized startup of PSA assemblies, as well as to energy-producing assemblies, hydrogen-generation assemblies, and/or fuel cell systems containing the same, and to methods of operating the same. The PSA assemblies include at least one adsorbent bed, and typically a plurality of adsorbent beds, that include an adsorbent region including adsorbent adapted to remove impurities from a mixed gas stream containing hydrogen gas as a majority component and other gases. The mixed gas stream may be produced by a hydrogen-producing region of a fuel processing system, and the PSA assembly may produce a product hydrogen stream from the mixed gas stream. The product hydrogen stream may be consumed by a fuel cell stack to provide a fuel cell system that produces electrical power.

The PSA assembly may be in fluid communication with a hydrogen source that may be utilized, together with the methods described herein, to minimize or otherwise reduce the startup time of the PSA assembly. These methods may include defined shutdown procedures that place the PSA assembly in a controlled dormant state when not in use, and/or defined startup procedures that allow the PSA assembly to quickly begin producing substantially pure hydrogen gas. The PSA assembly is configured or otherwise controlled to enable startup to proceed quickly and at least partially in parallel with (i.e., concurrently with) the startup of other system components, thereby reducing the overall startup time of a hydrogen-generation assembly and/or an energy-producing assembly that includes the PSA assembly.

DETAILED DESCRIPTION AND BEST MODE OF THE DISCLOSURE

Figure 1:
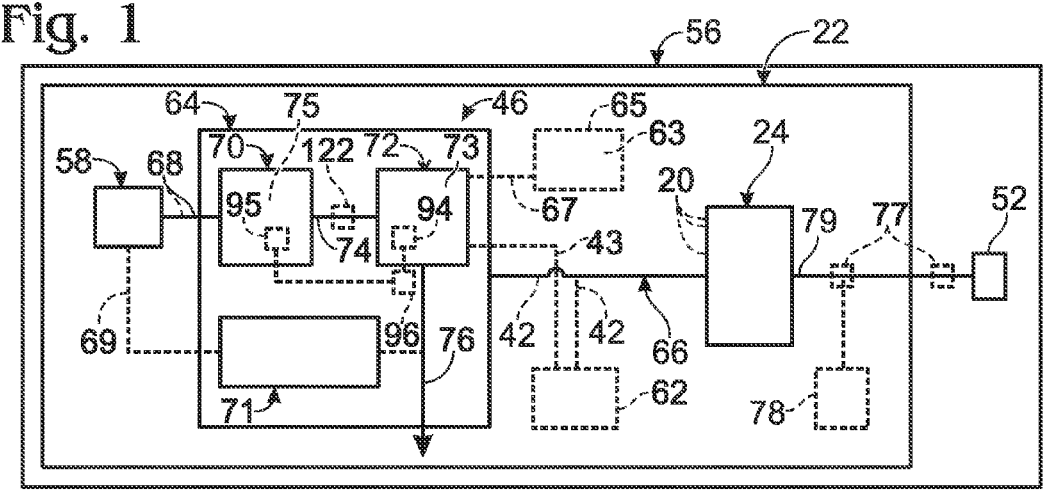
FIG. 1 is a schematic view of an illustrative, non-exclusive example of an energy-producing and consuming assembly that includes a hydrogen-generation assembly with an associated feedstock delivery system and a fuel processing system, as well as a fuel cell stack and an energy-consuming device.

FIG. 1 illustrates schematically an illustrative, non-exclusive example of an energy-producing and consuming assembly 56. Energy-producing and consuming assembly 56 includes an energy-producing system 22 and at least one energy-consuming device 52 adapted to exert an applied load on energy-producing system 22. In the illustrative example, energy-producing system 22 includes a fuel cell stack 24 and a hydrogen-generation assembly 46. More than one of any of the illustrated components may be used without departing from the scope of the present disclosure. The energy-producing system shown in FIG. 1 has been schematically illustrated, and it is within the scope of the present disclosure that such systems also may include additional components that are not specifically illustrated in the schematic figures, such as air delivery systems, heat exchangers, sensors, controllers, control systems, flow-regulating devices, fuel and/or feedstock delivery assemblies, heating assemblies, cooling assemblies, batteries, and the like. System 22 also may be referred to as a fuel cell system and/or a hydrogen-producing fuel cell system.

As discussed in more detail herein, hydrogen-generation assemblies and/or fuel cell systems according to the present disclosure include a separation assembly 72 that includes at least one pressure swing adsorption (PSA) assembly 73 that is adapted to increase the purity of the hydrogen gas that is produced in the hydrogen-generation assembly and/or delivered for consumption in the fuel cell stack to produce an electrical output. In a PSA process, gaseous impurities are removed from a stream containing hydrogen gas as a majority component, as well as other gases as minority components. PSA is based on the principle that certain gases, under the proper conditions of temperature and pressure, will be adsorbed onto an adsorbent material more strongly than other gases. These impurities, or "other gases," may thereafter be desorbed and removed, such as in the form of a byproduct stream. The success of using PSA for hydrogen purification is due to the relatively strong adsorption of common impurity gases (such as, but not limited to, $CO$, $CO_2$, hydrocarbons including $CH_4$, and $N_2$) on the adsorbent material. Hydrogen gas adsorbs only very weakly and so hydrogen gas passes through the adsorbent bed while the impurities are retained on the adsorbent material.

As discussed in more detail herein, a PSA process typically involves repeated, or cyclical, application of at least pressurization, separation (adsorption), equalization, depressurization (desorption), and purge steps, or processes, to selectively remove impurities from the hydrogen gas and then desorb the impurities. Accordingly, the PSA process may be described as being adapted to repeatedly enable a PSA cycle of steps, or stages, such as the above-described steps. The degree of separation is affected by the pressure difference between the pressure of the mixed gas stream and the pressure of the byproduct stream. Accordingly, the desorption step will typically include reducing the pressure within the portion of the PSA assembly containing the adsorbed gases, and optionally may even include drawing a vacuum (i.e., reducing the pressure to less than atmospheric or ambient pressure) on that portion of the assembly. Similarly, increasing the feed pressure of the mixed gas stream to the adsorbent regions of the PSA assembly may beneficially affect the degree of separation during the adsorption step.

As illustrated schematically in FIG. 1, hydrogen-generation assembly 46 includes at least a fuel processing system 64 and a feedstock delivery system 58, as well as the associated fluid conduits interconnecting various components of the system. As used herein, the term "hydrogen-generation assembly" may be used to refer to fuel processing system 64 and associated components of the energy-producing system, such as feedstock delivery systems 58, heating assemblies, separation regions or devices, air delivery systems, fuel delivery systems, fluid conduits, heat exchangers, cooling assemblies, sensor assemblies, flow regulators, controllers, etc. All of these illustrative components are not required to be included in any hydrogen-generation assembly or used with any fuel processing system according to the present disclosure. Similarly, other components may be included or used as part of the hydrogen-generation assembly.

The hydrogen-generation assembly, including the hydrogen-producing region thereof, may be selectively configured in and between a plurality of operating states, which also may be referred to herein as HGA (or HPR) states. This configuration and transitions may be implemented and/or controlled via any suitable manual and/or computerized mechanism. These operating states may include but are not limited to: a hydrogen-producing state, in which the hydrogen-generation assembly is receiving feedstock supply stream(s) 68 and producing a mixed gas (or reformate) stream 74; a shutdown state, in which the hydrogen-generation assembly is performing the actions necessary to transition from the hydrogen-producing state to a dormant state; a dormant state, in which the hydrogen-generation assembly is not actively receiving or emitting streams and is not heated and/or pressurized to be "primed" to produce the mixed gas stream; a startup state, in which the hydrogen-generation assembly is performing the actions necessary to transition from the dormant state to the hydrogen-producing state; and an idle state, in which the hydrogen-generation assembly is ready, or "primed" (i.e., heated and/or pressurized to a suitable hydrogen-producing temperature and/or pressure), to receive input stream(s) 68 and to produce mixed gas stream 74 therefrom but in which the hydrogen-generation assembly is not receiving feedstock supply stream(s) 68 and producing mixed gas stream 74 therefrom. These "operating states" also may be referred to as "states."

Feedstock delivery system 58 is adapted to deliver to fuel processing system 64 one or more feedstocks via one or more feed streams, which may be referred to generally as feedstock supply stream(s) 68 and/or feed stream(s) 68. In the following discussion, reference may be made only to a single feedstock supply stream, but it is within the scope of the present disclosure that two or more such streams, of the same or different composition, may be used. In some embodiments, air may be supplied to fuel processing system 64 via a blower, fan, compressor, or other suitable air delivery system, and/or a water stream may be delivered from a separate water source.

Fuel processing system 64 includes any suitable device(s) and/or structure(s) that are configured to produce hydrogen gas from feedstock supply stream(s) 68. As schematically illustrated in FIG. 1, fuel processing system 64 includes a hydrogen-producing region 70. Accordingly, fuel processing system 64 may be described as including a hydrogen-producing region 70 that produces a hydrogen-rich stream 74 that includes hydrogen gas as a majority component from the feedstock supply stream. While hydrogen-rich stream 74 contains hydrogen gas as its majority component, it also contains other gases as minority components, and as such may be referred to as a mixed gas stream that contains hydrogen gas and other gases. Illustrative, non-exclusive examples of these other gases, or impurities, include one or more of carbon monoxide, carbon dioxide, water, methane, and unreacted feedstock.

Illustrative, non-exclusive examples of suitable mechanisms for producing hydrogen gas from feedstock supply stream(s) 68 in hydrogen-producing region 70 include steam reforming and autothermal reforming, in which reforming catalysts are used to produce hydrogen gas from a feedstock supply stream 68 containing water and at least one carbon-containing feedstock. Other illustrative, non-exclusive examples of suitable mechanisms for producing hydrogen gas include pyrolysis and catalytic partial oxidation of a carbon-containing feedstock, in which case feedstock supply stream 68 does not contain water. Still another suitable mechanism for producing hydrogen gas is electrolysis, in which case the feedstock is water. Illustrative, non-exclusive examples of suitable carbon-containing feedstocks include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol.

Hydrogen-generation assembly 46 may utilize more than a single hydrogen-producing mechanism in hydrogen-producing region 70 and may include more than one hydrogen-producing region, Each of these mechanisms is driven by, and results in, different thermodynamic balances in hydrogen-generation assembly 46. Accordingly, hydrogen-generation assembly 46 may further include a temperature modulating assembly 71, such as a heating assembly and/or a cooling assembly. Temperature modulating assembly 71 may be configured as part of fuel processing system 64 or may be an external component that is in thermal and/or fluid communication with hydrogen-producing region 70. Temperature modulating assembly 71 may consume, or combust, a fuel stream, such as to generate heat, may consist of an electrical heater, and/or may direct heat energy from another source to the hydrogen-generation assembly. While not required in all embodiments of the present disclosure, the combustible fuel stream may be delivered from the feedstock delivery system. For example, and as indicated in dashed lines in FIG. 1, this fuel, or feedstock, may be received from feedstock delivery system 58 via a fuel supply stream 69. In some embodiments, the hydrogen-producing region and the temperature modulating assembly may receive feedstock supply streams and fuel streams, respectively, having the same compositions, including (but not limited to) streams containing a carbon-containing feedstock and at least 25 volume percent water. Fuel supply stream 69 may include combustible fuel or, alternatively, may include fluids to facilitate cooling. Temperature modulating assembly 71 also may receive some or all of its fuel from other sources or supply systems, such as from one or more additional storage tanks and/or from a PSA assembly 73. The temperature modulating assembly also may receive the air stream from any suitable source, including the environment within which the assembly is used. Blowers, fans, and/or compressors may be used to provide the air stream, but this is not required to all embodiments.

Temperature modulating assembly 71 may include one or more heat exchangers, burners, combustion systems, and other such devices for supplying heat to regions of the fuel processing system and/or other portions of assembly 56. Depending on the configuration of hydrogen-generation assembly 46, temperature modulating assembly 71 also may, or alternatively, include heat exchangers, fans, blowers, cooling systems, and other such devices for cooling regions of fuel processing system 64 or other portions of assembly 56. For example, when fuel processing system 64 is configured with a hydrogen-producing region 70 based on steam reforming or another endothermic reaction, temperature modulating assembly 71 may include systems for supplying heat to maintain the temperature of hydrogen-producing region 70 and the other components in the proper range.

When the fuel processing system is configured with a hydrogen-producing region 70 based on catalytic partial oxidation or another exothermic reaction, temperature modulating assembly 71 may include systems for removing heat, i.e., supplying cooling, to maintain the temperature of the fuel processing system in the proper range. As used herein, the term "heating assembly" is used to refer generally to temperature modulating assemblies that are configured to supply heat or otherwise increase the temperature of all or selected regions of the fuel processing system. As used herein, the term "cooling assembly" is used to refer generally to temperature moderating assemblies that are configured to cool, or reduce the temperature of, all or selected regions of the fuel processing system.

Figure 2:
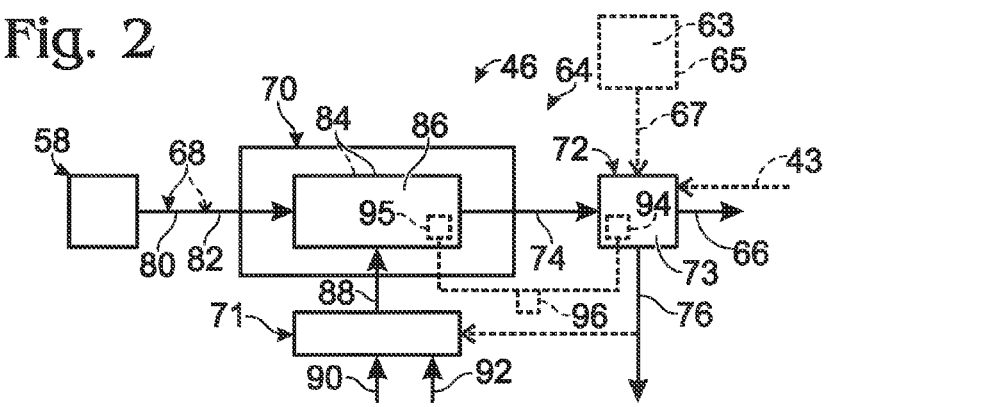
FIG. 2 is a schematic view of a hydrogen-producing assembly in the form of a steam reformer adapted to produce a reformate stream containing hydrogen gas and other gases from water and at least one carbon-containing feedstock.

FIG. 2 provides an illustrative, non-exclusive example of a hydrogen-generation assembly 46 that includes fuel processing system 64 with a hydrogen-producing region 70 that is configured to produce mixed gas stream 74 by steam reforming one or more feedstock supply streams 68 containing water 80 and at least one carbon-containing feedstock 82. As illustrated, hydrogen-producing region 70 includes at least one reforming catalyst bed 84 containing one or more suitable reforming catalysts 86. In such an embodiment, the hydrogen-producing region may be referred to as a reforming region, and the mixed gas stream may be referred to as a reformate stream.

As also shown in FIGS. 1 and 2, the mixed gas stream is adapted to be delivered to a separation region, or assembly, 72 that includes at least one PSA assembly 73. PSA assembly 73 separates the mixed gas (or reformate) stream into product hydrogen stream 66 and at least one byproduct stream 76 that contains at least a substantial portion of the impurities, or other gases, present in mixed gas stream 74. Byproduct stream 76 may contain no hydrogen gas, but it typically will contain some hydrogen gas. While not required, it is within the scope of the present disclosure that fuel processing system 64 may be adapted to produce one or more byproduct streams containing sufficient amounts of hydrogen (and/or other) gas(es) to be suitable for use as a fuel, or feedstock, stream for a heating assembly (such as temperature modulating assembly 71) for the fuel processing system.

In some embodiments, the byproduct stream may have sufficient fuel value (i.e., hydrogen gas and/or other combustible gas content) to enable the heating assembly, when present, to maintain the hydrogen-producing region at a desired operating temperature or within a selected range of such temperatures. These temperatures may be referred to as hydrogen-producing temperatures and refer to a range of temperatures in which the hydrogen-producing region efficiently produces hydrogen gas from the feedstock supply stream(s). The hydrogen-producing temperatures may include a minimum hydrogen-producing temperature and a maximum hydrogen-producing temperature. These temperatures may be selected, or determined, by such factors as the catalyst being used, the feedstock(s) being used the configuration of the hydrogen-producing region, etc.

As illustrated in FIG. 2, the hydrogen-generation assembly includes a temperature modulating assembly in the form of a heating assembly 71 that is adapted to produce a heated exhaust stream 88 that is adapted to heat at least the reforming region of the hydrogen-generation assembly, such as to at least a minimum hydrogen-producing temperature. It is within the scope of the present disclosure that stream 88 may be used to heat other portions of the hydrogen-generation assembly and/or energy-producing system 22.

As indicated in dashed lines in FIGS. 1 and 2, it is within the scope of the present disclosure that the byproduct stream from the PSA assembly may form at least a portion of the fuel stream for the heating assembly. Also shown in FIG. 2 are air stream 90, which may be delivered from any suitable air source, and fuel stream 92, which contains any suitable combustible fuel suitable for being combusted with air in the heating assembly. Fuel stream 92 may be used as the sole fuel stream for the heating assembly, but as discussed, it is also within the scope of the disclosure that other combustible fuel streams may be used, such as the byproduct stream from the PSA assembly, the anode exhaust stream from a fuel cell stack, etc. When the byproduct or exhaust streams from other components of system 22 have sufficient fuel value, fuel stream 92 may not be used. When they do not have sufficient fuel value, are used for other purposes, or are not being generated, fuel stream 92 may be used instead or in combination.

Illustrative, non-exclusive examples of suitable fuels for heating assembly 71 include one or more of the above-described carbon-containing feedstocks, although others may be used. As an illustrative, non-exclusive example of temperatures that may be achieved and/or maintained in hydrogen-producing region 70 through the use of heating assembly 71, steam reformers typically operate at temperatures in the range of 200° C. and 900° C. Temperatures outside of this range are within the scope of the disclosure. When the carbon-containing feedstock is methanol, the steam reforming reaction will typically operate in a (hydrogen-producing) temperature range of approximately 200-500° C. Illustrative subsets of this range include 250-400° C., 275-325° C., 300-425° C., 350-450° C., 375-425° C., and 375-400° C. When the carbon-containing feedstock is a hydrocarbon, ethanol, or a similar alcohol, a (hydrogen-producing) temperature range of approximately 400-900° C. will typically be used for the steam reforming reaction. Illustrative subsets of this range include 750-850° C., 650-750° C., 700-800° C., 700-900° C., 500-800° C., 400-600° C., and 600-800° C.

It is within the scope of the present disclosure that separation assembly 72 may be implemented within system 22 anywhere downstream from the hydrogen-producing region and upstream from the fuel cell stack. In the illustrative, non-exclusive example shown schematically in FIG. 1, the separation assembly is depicted as part of the hydrogen-generation assembly, but this construction is not required. It is also within the scope of the present disclosure that the hydrogen-generation assembly may utilize a chemical or physical separation process in addition to PSA assembly 73 to remove or reduce the concentration of one or more selected impurities from the mixed gas stream. When separation assembly 72 utilizes a separation process in addition to PSA, the one or more additional processes may be performed at any suitable location within system 22 and are not required to be implemented with the PSA assembly. An illustrative chemical separation process is the use of a methanation catalyst to selectively reduce the concentration of carbon monoxide present in mixed gas (or reformate) stream 74. Other illustrative chemical separation processes include partial oxidation of carbon monoxide to form carbon dioxide and water-gas shift reactions to produce hydrogen gas and carbon dioxide from water and carbon monoxide. Illustrative physical separation processes include the use of a physical membrane or other barrier adapted to permit the hydrogen gas to flow therethrough but adapted to prevent at least selected impurities from passing therethrough. These membranes may be referred to as being hydrogen-selective membranes. Illustrative, non-exclusive examples of suitable membranes are formed from palladium or a palladium alloy, such as are disclosed in the references incorporated herein.

The hydrogen-generation assembly 46 may be configured to produce at least substantially pure hydrogen gas, and even pure, or purified, hydrogen gas. For the purposes of the present disclosure, substantially pure hydrogen gas is greater than 90% pure, and may be greater than 95% pure, greater than 99% pure, greater than 99.5%, or even 99.9% pure. Unless otherwise specified herein, compositional percentages refer to volume percentages, or vol %. Illustrative, non-exclusive examples of suitable fuel processing systems are disclosed in U.S. Pat. Nos. 6,221,117, 5,997,594, 5,861,137, and in U.S. Patent Application Publication Nos. 2001/0045061, 2003/0192251, and 2003/0223926. The complete disclosures of the above-identified patents and patent applications are hereby incorporated by reference.

With reference to FIG. 1, hydrogen gas from fuel processing system 64 may be delivered to one or more of a storage device 62, such as via storage hydrogen stream 42, and fuel cell stack 24. Some or all of hydrogen stream 66 may additionally, or alternatively, be delivered, via a suitable conduit, for use in another hydrogen-consuming process, burned for fuel or heat, or stored for later use. Fuel cell stack 24 includes at least one fuel cell 20, and typically includes a plurality of fluidly and electrically interconnected fuel cells. When these cells are connected together in series, the power output of the fuel cell stack is the sum of the power outputs of the individual cells. The cells in fuel cell stack 24 may be connected in series, parallel, or combinations of series and parallel configurations. As illustrated by dashed lines in FIGS. 1 and 2, storage device 62 also may be in fluid communication with PSA assembly 73 via PSA hydrogen delivery stream 43. In such a configuration, hydrogen gas that was stored in storage device 62 may be delivered to the PSA assembly, such as for use to pressurize one or more adsorbent beds of the PSA assembly and/or as a purge stream for the PSA assembly. As discussed, this hydrogen gas from the storage device may have been previously produced in the hydrogen-producing region and/or purified in the PSA assembly.

Storage device 62 may be any suitable device for storing hydrogen gas produced by fuel processing system 64. Illustrative, non-exclusive examples of suitable storage devices 62 include metal hydride beds, tanks or other suitable pressure vessels for storing hydrogen gas, and adsorption beds containing other hydrogen-adsorbing materials such as sodium alanate, carbon nanotubes, or metal-organic polymers. Illustrative, non-exclusive examples of suitable metal hydrides include $LaNi_5$ and other alloys of lanthanum and nickel. The hydride and adsorption beds will typically include a pressure vessel that contains the metal hydride or adsorbent. If the storage device includes a metal hydride bed, the system may be designed to optimize heat transfer to and from the metal hydride alloy such that heat can be delivered to the hydride bed at a rate sufficient to produce the desired flow rate of hydrogen from the hydride bed and removed from the bed at a rate sufficient to allow for the desired hydrogen absorption rate. Thus, the hydride bed may include optimized heat transfer structures, illustrative, non-exclusive examples of which include, but are not limited to, internal or external fins, metal brushes, water pipes, heat pipes, air tubes, thermal ballast, or other heat transfer means. The sources of heat may include, separately or in combination, electricity (such as in the form of a resistance heater or other electrically powered heat source), fuel cell stack exhaust, reformer exhaust, fuel cell stack coolant, hot air from a cabinet heater, energy stored as heat in the fuel processor or fuel cell system components, or heat from any other suitable source or process.

As illustrated by dashed lines in FIGS. 1 and 2, PSA assembly 73 may be in fluid communication with a purge gas source 65, such as via a purge gas supply stream 67. Purge gas source 65 is adapted to produce a purge gas 63 that does not show, or exhibit, significant adsorption onto the adsorbent materials within the adsorbents used in the PSA assembly. An illustrative, non-exclusive example of purge gas 63 is purified hydrogen gas, such as may be produced by hydrogen-generation assemblies according to the present disclosure. Accordingly, hydrogen gas that is purified by the PSA assembly may be stored, at least temporarily, in the purge gas source for use as a purge gas. In such a configuration, the purge gas source may be, or include, a pressurized tank, or vessel, that receives and selectively returns hydrogen gas from and to the PSA assembly. As also discussed, hydrogen storage device 62 may be used to supply hydrogen gas to the PSA assembly, such as to form a purge gas stream. Other purge gases or combinations of purge gases may be used without departing from the scope of the present disclosure. Other illustrative, non-exclusive examples of purge gas 63 include reformate produced by the hydrogen-producing region and/or an inert, or sweep, gas that is selected due to it not being (or only being weakly) adsorbed on the adsorbent.

The purge gas may be obtained and/or delivered from any suitable source, including but not limited to the ambient environment, product or byproduct streams from other chemical processes, facilities gas streams, bulk gas storage tanks, liquefied gas storage tanks, hydride beds, or absorbent beds. If the purge gas is hydrogen gas, the hydrogen purge gas may be the product of a chemical process, including but not limited to a reforming apparatus, reacting water with aluminum/gallium or magnesium, reacting methanol-water with hydrogen peroxide over a suitable catalyst, or decomposing a chemical hydride such as sodium borohydride.

Figure 3:
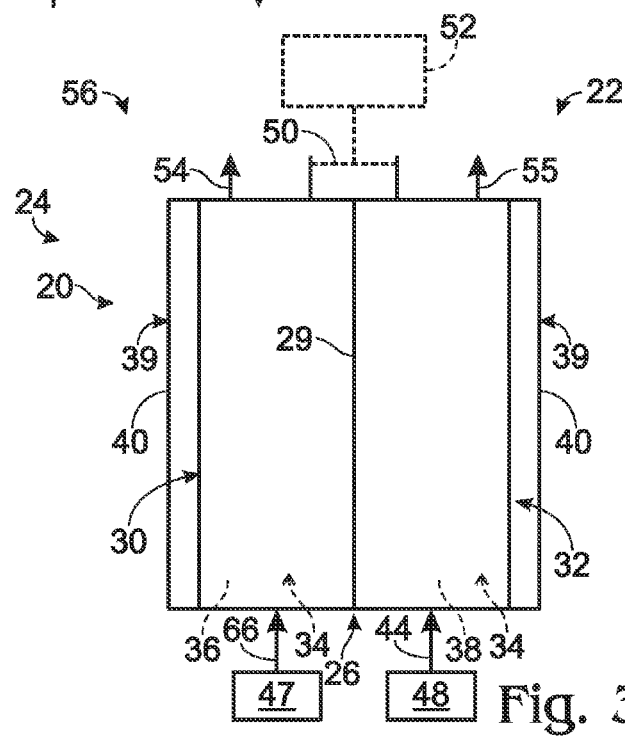
FIG. 3 is a schematic view of a fuel cell, such as may form part of a fuel cell stack used with a hydrogen-generation assembly according to the present disclosure.

FIG. 3 illustrates schematically a fuel cell 20, one or more of which may be configured to form fuel cell stack 24. The fuel cell stacks of the present disclosure may utilize any suitable type of fuel cell, and preferably fuel cells that receive hydrogen and oxygen as proton sources and oxidants. Illustrative, non-exclusive examples of types of fuel cells include proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 3.

Proton exchange membrane fuel cells typically utilize a membrane-electrode assembly 26 consisting of an ion exchange, or electrolytic, membrane 29 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cells 20 carry the relative voltage potentials produced by the fuel cells.

In operation, hydrogen gas from product stream 66 is delivered to the anode region, and oxidant 44 is delivered to the cathode region. A typical, but not exclusive, oxidant is oxygen. As used herein, hydrogen refers to hydrogen gas and oxygen refers to oxygen gas. The following discussion will refer to hydrogen as the proton source, or fuel, for the fuel cell (stack), and oxygen as the oxidant, although it is within the scope of the present disclosure that other fuels and/or oxidants may be used. Hydrogen and oxygen 44 may be delivered to the respective regions of the fuel cell via any suitable mechanism from respective sources 47 and 48. Illustrative, non-exclusive examples of suitable sources 48 of oxygen 44 include a pressurized tank of oxygen or air, or a fan, compressor, blower, or other device for directing air to the cathode region.

Hydrogen and oxygen typically combine with one another via an oxidation-reduction reaction. Although membrane 29 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 29 also tends not to be electrically conductive, an external circuit 50 is the lowest energy path for the remaining electron, and is schematically illustrated in FIG. 3. In cathode region 32, electrons from the external circuit and protons from the membrane combine with oxygen to produce water and heat.

Also shown in FIG. 3 are an anode purge, or exhaust, stream 54, which may contain hydrogen gas, and a cathode air exhaust stream 55, which is typically at least partially, if not substantially, depleted of oxygen. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, a fuel cell stack 24 will typically contain a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load, This net flow of electrons produces an electric current that may be used to satisfy an applied load, such as from at least one of an energy-consuming device 52 and energy-producing system 22.

For a constant output voltage, such as 12 volts, 24 volts, 48 volts, 54 volts, etc., the output power may be determined by measuring the output current. The electrical output may be used to satisfy an applied load, such as from energy-consuming device 52. FIG. 1 schematically depicts that energy-producing system 22 may include at least one energy-storage device 78. Device 78, when included, may be adapted to store at least a portion of the electrical output, or power, 79 from fuel cell stack 24. An illustrative, non-exclusive example of a suitable energy-storage device 78 is a battery, but others may be used, such as flywheels, supercapacitors, and ultracapacitors. Energy-storage device 78 may additionally or alternatively be used to power energy-producing system 22 during start-up of the system.

The at least one energy-consuming device 52 may be electrically coupled to energy-producing system 22, such as to fuel cell stack 24 and/or one or more energy-storage devices 78 associated with the stack. Device 52 applies a load to energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative, non-exclusive examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for energy-producing system 22 of which fuel cell stack 24 forms a part. As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52. Module 77 may include such illustrative structure as buck or boost converters, inverters, power filters, and the like.

Figure 4:
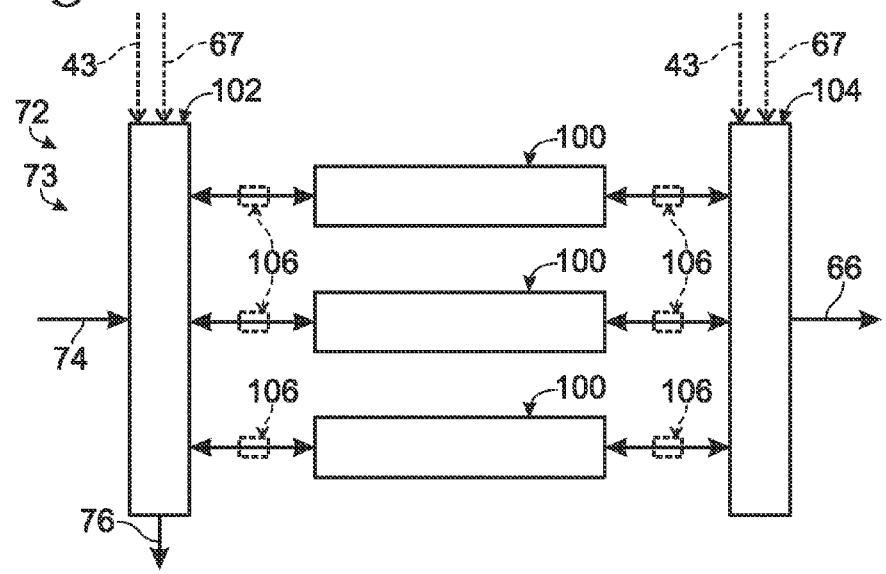
FIG. 4 is a schematic view of a pressure swing adsorption assembly that includes optional inputs from a stored hydrogen source according to the present disclosure.

In FIG. 4, an illustrative, non-exclusive example of a PSA assembly 73 is schematically illustrated. As shown, PSA assembly 73 includes a plurality of adsorbent beds 100 that are fluidly connected via distribution assemblies 102 and 104. Adsorbent beds 100 may additionally or alternatively be referred to as adsorbent chambers or adsorption regions. The distribution assemblies have been schematically illustrated in FIG. 4 and may include any suitable structure for selectively establishing and restricting fluid flow between the beds and/or the input and output streams of PSA assembly 73. As shown, the input and output streams include at least mixed gas stream 74, product hydrogen stream 66, and byproduct stream 76. Optionally, the input streams also may include PSA hydrogen delivery stream 43 and PSA purge gas supply stream 67. In addition, PSA assembly 73 may include suitable measurement devices 106 that are configured or otherwise designed to measure relevant properties associated with the adsorbent, beds, gases within the PSA assembly, etc., such as temperature, pressure, gas component concentration, and the like. While shown located at the inlet and outlet to adsorbent beds 100 in FIG. 4, it is within the scope of the present disclosure that measurement devices 106 may be placed at any suitable location within PSA assembly 73.

Illustrative, non-exclusive examples of suitable distribution assembly structures include one or more of manifolds, such as distribution and collection manifolds that are respectively adapted to distribute fluid to and collect fluid from the beds, and valves, such as check valves, solenoid valves, purge valves, and the like. In the illustrative, non-exclusive example of FIG. 4, three beds 100 are shown, but it is within the scope of the present disclosure that the number of beds may vary, such as to include more or less beds than shown in FIG. 4. Typically, PSA assembly 73 will include at least two beds, and often will include three, four, or more beds. While not required, PSA assembly 73 is preferably adapted to provide a continuous flow of product hydrogen stream, with at least one of the plurality of beds exhausting this stream when the assembly is in use and receiving a continuous flow of mixed gas stream 74.

In the illustrative, non-exclusive example of FIG. 4, distribution assembly 102 is adapted to selectively deliver mixed gas stream 74 to the plurality of beds and to collect and exhaust byproduct stream 76, and distribution assembly 104 is adapted to collect the purified hydrogen gas that passes through the beds and which forms product hydrogen stream 66, and in some embodiments to deliver a portion of the purified hydrogen gas to the beds for use as a purge stream. The distribution assemblies may be configured for fixed or rotary positioning relative to the beds. Furthermore, the distribution assemblies may include any suitable type and number of structures and devices to selectively distribute, regulate, meter, prevent, and/or collect flows of the corresponding gas streams. As illustrative, non-exclusive examples, distribution assembly 102 may include mixed gas and exhaust manifolds, or manifold assemblies, and distribution assembly 104 may include product and purge manifolds, or manifold assemblies. In practice, PSA assemblies that utilize distribution assemblies that rotate relative to the beds may be referred to as rotary pressure swing adsorption assemblies, and PSA assemblies in which the manifolds and beds are not adapted to rotate relative to each other to selectively establish and restrict fluid connections may be referred to as fixed bed, or discrete bed, pressure swing adsorption assemblies. Both constructions are within the scope of the present disclosure.

Gas purification by pressure swing adsorption involves sequential pressure cycling and flow reversal of gas streams relative to the adsorbent beds. In the context of purifying a mixed gas stream comprised substantially of hydrogen gas, the mixed gas stream is delivered under relatively high pressure to one end of the adsorbent beds and thereby exposed to the adsorbent(s) contained in the adsorbent region thereof. Illustrative, non-exclusive examples of delivery pressures for mixed gas stream 74 include pressures in the range of 40-200 psi, such as pressures in the range of 50-150 psi, 50-100 psi, 100-150 psi, 70-100 psi, etc., although pressures outside of this range are within the scope of the present disclosure. As the mixed gas stream flows through the adsorbent region, carbon monoxide, carbon dioxide, water and/or other ones of the impurities, or other gases, are adsorbed, and thereby at least temporarily retained, on the adsorbent. This is because these gases are more readily adsorbed on the selected adsorbents used in the PSA assembly. The remaining portion of the mixed gas stream, which now may perhaps more accurately be referred to as a purified hydrogen stream, passes through the bed and is exhausted from the other end of the bed. In this context, hydrogen gas may be described as being the less readily adsorbed component, while carbon monoxide, carbon dioxide, etc. may be described as the more readily adsorbed components of the mixed gas stream. The pressure of the product hydrogen stream is typically reduced prior to utilization of the gas by the fuel cell stack.

To remove the adsorbed gases, the flow of the mixed gas stream is stopped, the pressure in the bed is reduced, and the now desorbed gases are exhausted from the bed. The desorption step often includes selectively decreasing the pressure within the adsorbent region through the withdrawal of gas, typically in a countercurrent direction relative to the feed direction. This desorption step also may be referred to as a depressurization, or blowdown, step. This step often includes or is performed in conjunction with the use of a purge gas stream, which is typically delivered in a countercurrent flow direction to the direction at which the mixed gas stream flows through the adsorbent region. An illustrative, non-exclusive example of a suitable purge gas stream is a portion of the product hydrogen stream, as this stream is comprised of hydrogen gas, which is less readily adsorbed than the adsorbed gases. Other gases may be used in the purge gas stream, although these gases preferably are less readily adsorbed than the adsorbed gases, and even more preferably are not adsorbed, or are only weakly adsorbed, on the adsorbent(s) being used.

As discussed, this desorption step may include drawing an at least partial vacuum on the bed, but this is not required. While also not required, it is often desirable to utilize one or more equalization steps, in which two or more beds are fluidly interconnected to permit the beds to equalize the relative pressures therebetween. For example, one or more equalization steps may precede the desorption and pressurization steps. Prior to the desorption step, equalization is used to reduce the pressure in the bed and to recover some of the purified hydrogen gas contained in the bed, while prior to the (re)pressurization step, equalization is used to increase the pressure within the bed. Equalization may be accomplished using concurrent and/or countercurrent flow of gas. After the desorption and/or purge step(s) of the desorbed gases is completed, the bed is again pressurized and ready to receive and remove impurities from the portion of the mixed gas stream delivered thereto.

For example, when a bed is ready to be regenerated, it is typically at a relatively high pressure and contains a quantity of hydrogen gas. While this gas (and pressure) may be removed simply by venting the bed, other beds in the assembly will need to be pressurized prior to being used to purify the portion of the mixed gas stream delivered thereto. Furthermore, the hydrogen gas in the bed to be regenerated preferably is recovered so as to not negatively impact the efficiency of the PSA assembly. Therefore, interconnecting these beds in fluid communication with each other permits the pressure and hydrogen gas in the bed to be regenerated to be reduced while also increasing the pressure and hydrogen gas in a bed that will be used to purify impure hydrogen gas (i.e., mixed gas stream 74) that is delivered thereto. In addition to, or in place of, one or more equalization steps, a bed that will be used to purify the mixed gas stream may be pressurized prior to the delivery of the mixed gas stream to the bed. For example, some of the purified hydrogen gas may be delivered to the bed to pressurize the bed. While it is within the scope of the present disclosure to deliver this pressurization gas to either end of the bed, in some embodiments it may be desirable to deliver the pressurization gas to the opposite end of the bed than the end to which the mixed gas stream is delivered.

The PSA assembly may be selectively configured, or transitioned, between a plurality of operating states, which also may be referred to as PSA states and/or PSA operating states. These states may include, but are not limited to: a hydrogen purifying state, in which the PSA assembly is receiving a mixed gas stream 74 and emitting a product hydrogen stream 66 and/or byproduct stream 76; a shutdown state, in which the PSA assembly is performing the actions necessary to transition from the hydrogen-purifying state to a dormant state; a dormant state, in which the PSA assembly is not actively receiving or emitting gas streams on a substantially continuous basis; a startup state, in which the PSA assembly is performing the actions necessary to transition from the dormant state to the hydrogen purifying state; and an idle state, in which the PSA assembly is ready, or "primed," (i.e., at a suitable temperature and/or pressure for efficiently receiving the mixed gas stream and producing product hydrogen stream 66 therefrom) to receive input streams and produce purified output streams. The previously discussed pressurization, separation, depressurization, purge, and equalization steps of the PSA assembly occur during the hydrogen purifying state and may be referred to as a PSA cycle. The sequencing, duration, and/or timing of these steps may be defined, regulated, and/or otherwise controlled by a controller, manually, by the inherent operation of the PSA assembly, or combinations thereof.

The above discussion of the general operation of a PSA assembly has been somewhat simplified. Illustrative, non-exclusive examples of pressure swing adsorption assemblies, including components thereof and methods of operating the same, are disclosed in U.S. Pat. Nos. 3,564,816, 3,986,849, 4,331,455, 5,441,559, 6,497,856, 6,692,545, 7,160,367, 7,393,382, 7,399,342, 7,416,569, and U.S. Patent Application Publication Nos. 2009/0151249 and 2009/0151560, the complete disclosures of which are hereby incorporated by reference.

In the above discussion of a PSA assembly, timing of the various gas flows, together with the opening and closing of appropriate valves and control of other system hardware, software, and/or other controls may be accomplished via any suitable manner or mechanism. For example, this control may be implemented manually by the user, through the use of a controller, or by a combination of the two. The controller may include any suitable type and number of devices or mechanisms to implement and provide for the desired monitoring and/or control of the PSA assembly. As illustrative, non-exclusive examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into the PSA assembly or be a separate, stand-alone computing device. The controller may be adapted or otherwise programmed or designed to control the operation of the PSA assembly in the plurality of operating states of the PSA assembly, including optionally controlling transitions of the PSA assembly between stages of the PSA cycle and/or shutdown and startup states of the PSA assembly. The controller, when present, also may include and/or be in communication with any suitable sensors, detectors, communications links, and the like to enable the desired monitoring and control of the operation of the PSA assembly, including optional communication with other components of the energy-producing and consuming assembly, It is also within the scope of the present disclosure that the PSA controller, when present, may be adapted or otherwise programmed or configured to control other components of the energy-producing and consuming assembly, including the fuel processing system, hydrogen-generation assembly, feedstock delivery system, hydrogen source, fuel cell stack, power management module, and the like. Likewise, it is within the scope of the present disclosure that other components of the energy-producing and consuming assembly may include a dedicated or even integrated controller that is adapted to monitor and/or control the operation of this/these other component(s), and where applicable, control the transitions of these components between their respective operating states. As an illustrative, non-exclusive example, the hydrogen-generation assembly, and optionally, the fuel processing system and/or hydrogen-producing region thereof, may include or be in communication with a controller that is adapted to monitor and/or control the operation thereof, including configuring the assembly and/or system between its operating states. When the energy-producing and consuming assembly includes two or more controllers, the controllers may be in communication with each other. It is also within the scope of the present disclosure that the energy-producing and consuming assembly may include a single controller that monitors and/or controls the operation of two or more components thereof; such as the PSA assembly and at least a portion of the fuel processing system and/or fuel cell stack.

A controller that is integrated into and/or otherwise specifically associated with PSA assembly 72 is schematically indicated in FIGS. 1 and 2 at 94, and a controller that is integrated into and/or otherwise specifically associated with fuel processing system 64 is schematically indicated in FIGS. 1 and 2 at 95. For the purpose of completeness, a controller that is in communication with at least hydrogen-generation assembly 46 to monitor and control the operation of components thereof, such as at least PSA assembly 73 and hydrogen-producing region 70, is schematically indicated at 96.

Figure 5:
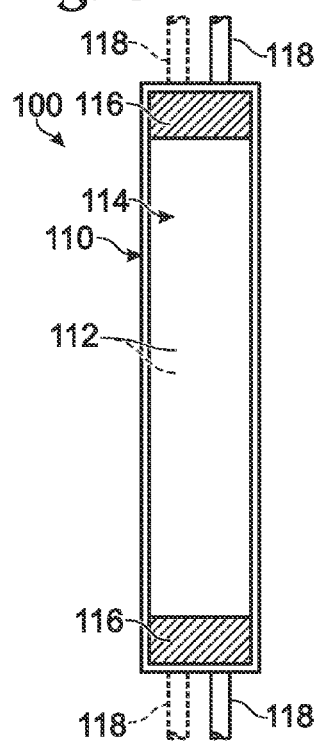
FIG. 5 is a schematic cross-sectional view of an illustrative, non-exclusive example of an adsorbent bed construction that may be used with PSA assemblies according to the present disclosure.

In FIG. 5, an illustrative, non-exclusive example of an adsorbent bed 100 is schematically illustrated. As shown, the bed defines an internal compartment 110 that contains at least one adsorbent 112, with each adsorbent being adapted to adsorb one or more of the components of the mixed gas stream. It is within the scope of the present disclosure that more than one adsorbent may be used. For example, a bed may include more than one adsorbent adapted to adsorb a particular component of the mixed gas stream, such as to adsorb carbon monoxide, and/or two or more adsorbents that are each adapted to adsorb a different component of the mixed gas stream. Similarly, an adsorbent may be adapted to adsorb two or more components of the mixed gas stream. Illustrative, non-exclusive examples of suitable adsorbents include activated carbon, alumina, and zeolite adsorbents. An additional example of a suitable adsorbent that may be present within the adsorbent region of the beds is a desiccant that is adapted to adsorb water present in the mixed gas stream. Illustrative, non-exclusive examples of suitable desiccants include silica and alumina gels. When two or more adsorbents are utilized, they may be sequentially positioned (in a continuous or discontinuous relationship) within the bed or may be mixed together. The type, number, amount and form of adsorbent in a particular PSA assembly may vary without departing from the scope of the present disclosure, such as according to one or more of the following factors: the operating conditions expected in the PSA assembly, the size of the adsorbent bed, the composition and/or properties of the mixed gas stream, the desired application for the product hydrogen stream produced by the PSA assembly, the operating environment in which the PSA assembly will be used, user preferences, etc.

When the PSA assembly includes a desiccant or other water-removal composition or device, it may be positioned to remove water from the mixed gas stream prior to adsorption of other impurities from the mixed gas stream. One reason for this is that water may negatively affect the ability of some adsorbents to adsorb other components of the mixed gas stream, such as carbon monoxide. An illustrative, non-exclusive example of a water-removal device is a condenser, but others may be used between the hydrogen-producing region and adsorbent region, as schematically illustrated in dashed lines at 122 in FIG. 1. For example, at least one heat exchanger, condenser or other suitable water-removal device may be used to cool the mixed gas stream prior to delivery of the stream to the PSA assembly. This cooling may condense some of the water present in the mixed gas stream. Continuing this example, and to provide a more specific (yet non-exclusive) illustration, mixed gas streams produced by steam reformers tend to contain at least 10%, and often at least 15% or more water when exhausted from the hydrogen-producing (i.e., the reforming) region of the fuel processing system. These streams also tend to be fairly hot, such as having a temperature of at least 200° C. (in the case of many mixed gas streams produced from methanol containing feedstocks), and at least 400-800° C. (in the case of many mixed gas streams produced from natural gas, propane or similar hydrocarbon carbon-containing feedstocks). When cooled prior to delivery to the PSA assembly, such as to an illustrative temperature in the range of 25-100° C. or even 40-80° C., most of this water will condense. The mixed gas stream may still be saturated with water, but the water content will tend to be less than 5 wt %.

The adsorbent(s) may be present in the bed in any suitable form, illustrative, non-exclusive examples of which include particulate form, bead form, porous discs or blocks, coated structures, laminated sheets, fabrics, and the like. When positioned for use in the beds, the adsorbents should provide sufficient porosity and/or gas flow paths for the non-adsorbed portion of the mixed gas stream to flow through the bed without significant pressure drop through the bed. As used herein, the portion of a bed that contains adsorbent will be referred to as the adsorbent region of the bed. In FIG. 5, an adsorbent region is indicated generally at 114. Beds 100 also may (but are not required to) include partitions, supports, screens and other suitable structure for retaining the adsorbent and other components of the bed within the compartment, in selected positions relative to each other, in a desired degree of compression, etc. These devices are generally referred to as supports and are generally indicated in FIG. 5 at 116. Therefore, it is within the scope of the present disclosure that the adsorbent region may correspond to the entire internal compartment of the bed, or only a subset thereof. Similarly, the adsorbent region may be comprised of a continuous region or two or more spaced apart regions without departing from the scope of the present disclosure.

Figure 6:
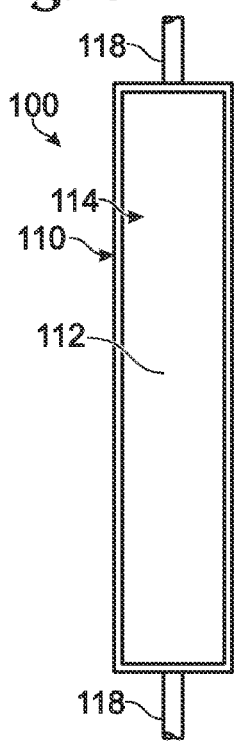
FIG. 6 is a schematic cross-sectional view of an illustrative, non-exclusive example of an adsorbent bed construction that may be used with PSA assemblies according to the present disclosure.
Figure 7:
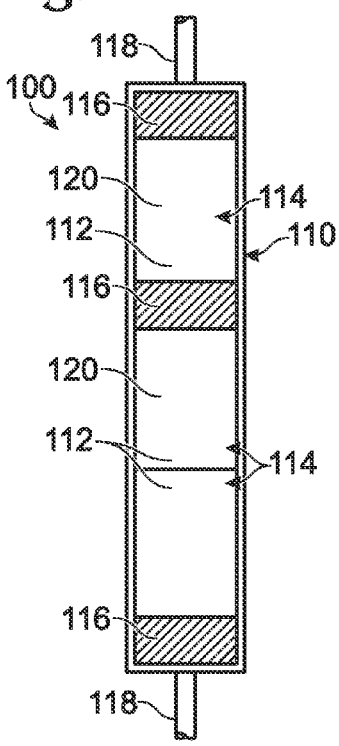
FIG. 7 is a schematic cross-sectional view of an illustrative, non-exclusive example of an adsorbent bed construction that may be used with PSA assemblies according to the present disclosure.

In the illustrative, non-exclusive example shown in FIG. 5, bed 100 includes at least one port 118 associated with each end region of the bed. As indicated in dashed lines, it is within the scope of the present disclosure that either or both ends of the bed may include more than one port. Similarly, it is within the scope of the disclosure that the ports may extend laterally from the beds or otherwise have a different geometry than the schematic examples shown in FIG. 5. Regardless of the configuration and/or number of ports, the ports are collectively adapted to deliver fluid for passage through the adsorbent region of the bed and to collect fluid that passes through the adsorbent region. As discussed, the ports may selectively, such as depending upon the particular implementation of the PSA assembly and/or stage in the PSA cycle, be used as an input port or an output port. For the purpose of providing a graphical example, FIG. 6 illustrates a bed 100 in which the adsorbent region extends along the entire length of the bed, i.e., between the opposed ports or other end regions of the bed, In FIG. 7, bed 100 includes an adsorbent region 114 that includes discontinuous subregions 120.

Figure 8:
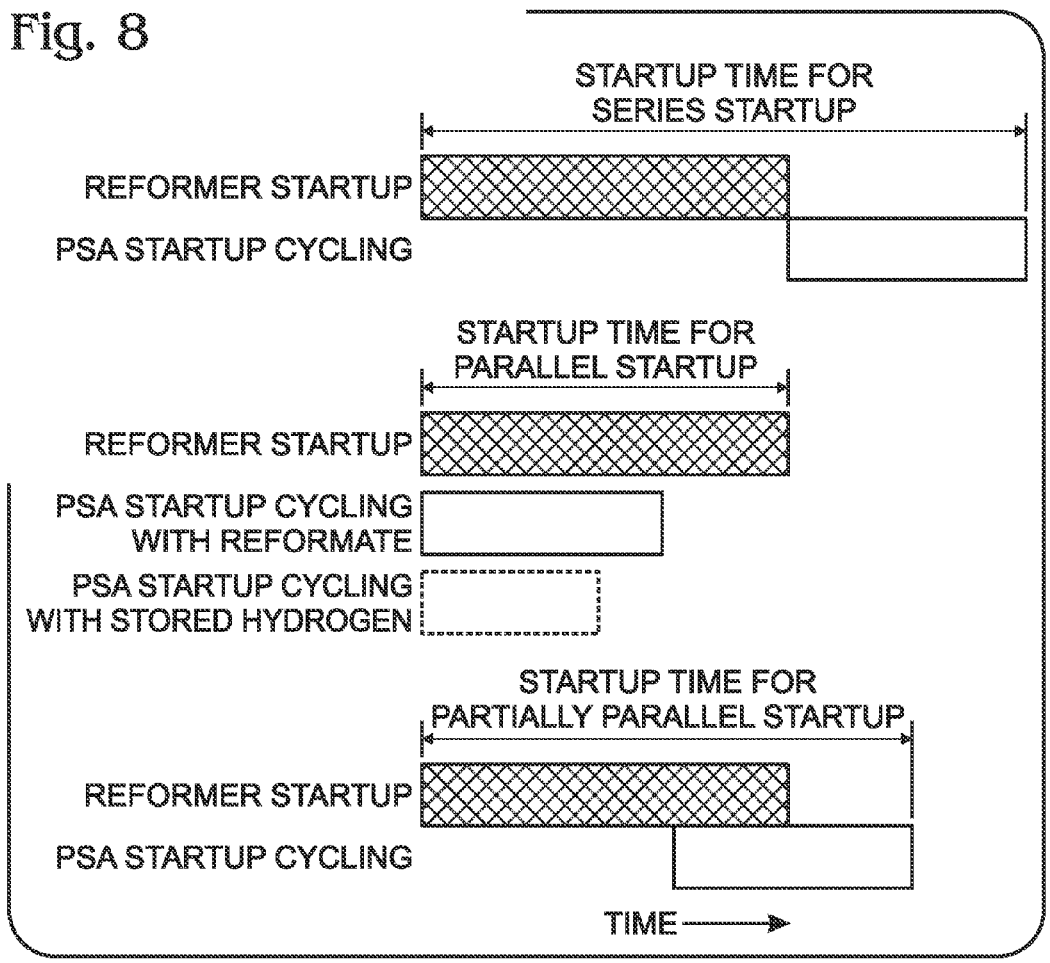
FIG. 8 is an illustrative, non-exclusive example of a timeline schematically representing the total time required to startup a hydrogen-generation assembly in the instance where startup of the reformer and the PSA assembly are commenced in series (top), in the instance where startup of the reformer and the PSA assembly are commenced in parallel (middle), and in the instance where the startup of the PSA assembly is at least partially concurrent with the startup of the reformer (bottom).

FIG. 8 schematically illustrates potential benefits of using the startup methods and hydrogen-generation assemblies according to the present disclosure. In the top timeline of FIG. 8, a typical startup timeline for a reformer (or other hydrogen-producing and/or hydrogen-generation assembly) and related PSA assembly is schematically illustrated. Since the reformer must be heated to a suitable (hydrogen-producing) operating temperature before it can begin to produce a product hydrogen stream in its hydrogen-producing operating state and since the PSA assembly requires a hydrogen stream before it can begin its startup sequence, the overall system startup sequence is essentially a series process, with the system waiting to begin startup of the PSA assembly until after the reformer startup is completed. Thus, the total startup time for the two assemblies may be considered to be at least the sum of the startup time for the reformer and the startup time for the PSA assembly.

By using a hydrogen storage device 62 and/or purge gas source 65, the startup process for the PSA assembly may proceed substantially in parallel with (i.e., concurrently in time with) the startup process for the reformer. In other words, the stored hydrogen gas may be used to supply the PSA assembly with hydrogen gas for its startup sequence, thereby permitting this startup sequence to occur while (or alternatively before or otherwise concurrently with) the startup sequence for the reformer assembly is proceeding. Thus, the total startup time for the two assemblies may be the longer of the startup time for the reformer and the startup time for the PSA assembly. This is schematically shown in the middle timeline of FIG. 8. As schematically illustrated in the timeline, the startup time of both the reformer and the PSA assembly may be decreased significantly through the use of stored hydrogen gas, such as from a storage device 62 and/or purge gas source 65, to startup the PSA assembly. This is due to the fact that, when PSA assembly 73 startup is performed using substantially pure hydrogen gas, the purity of the product hydrogen stream leaving the PSA assembly is much higher than the purity of the product hydrogen stream leaving a PSA assembly that is started up using mixed gas stream 74. Although not required, after being used as a purge gas for the PSA assembly, the hydrogen gas may be available for use as a combustible fuel source in temperature modulating assembly 71 used to heat hydrogen-producing region 70. As such, this use of stored hydrogen gas to startup the PSA assembly also may provide a combustible fuel stream to assist with the startup (heating to a suitable hydrogen-producing (operating) temperature) of the hydrogen producing region, and in some embodiments may even reduce this startup time as well. As also schematically illustrated in this portion of the middle timeline of FIG. 8, it is also within the scope of the present disclosure that stored reformate gas may be used to startup the PSA assembly. For example, a suitable quantity, or volume, of the reformate gas produced by the reformer during its hydrogen-producing operating state may be stored in a suitable reservoir, pressure vessel, or other storage device, and then this stored volume of reformate gas, which as discussed herein contains hydrogen gas as a majority component, may be used to startup the PSA assembly, such as from a depressurized, dormant state.

The startup process for the PSA assembly also may proceed partially in parallel with the startup process for the reformer, as shown in the bottom timeline of FIG. 8. In this case, the reformer startup process is begun and then, at a later time but prior to completion of the reformer startup process, the PSA assembly startup process is also begun. This procedure may be used, for example, with startup techniques according to the present disclosure that do not utilize a hydrogen storage device and/or purge gas source but instead rely on the reformate stream to provide purge gas to the PSA assembly. In this example, the time delay between the startup of the reformer and the startup of the PSA assembly is the time necessary to heat the reformer to a temperature at which it can begin to produce hydrogen gas. Once a sufficient quantity of hydrogen gas is being, or has been, produced, the PSA assembly startup procedure may begin. This timeline differs from the conventional, series (sequential) startup process in that the reformate stream may be used to initiate startup of the PSA assembly before startup of the reformer is completed.

Figure 9:
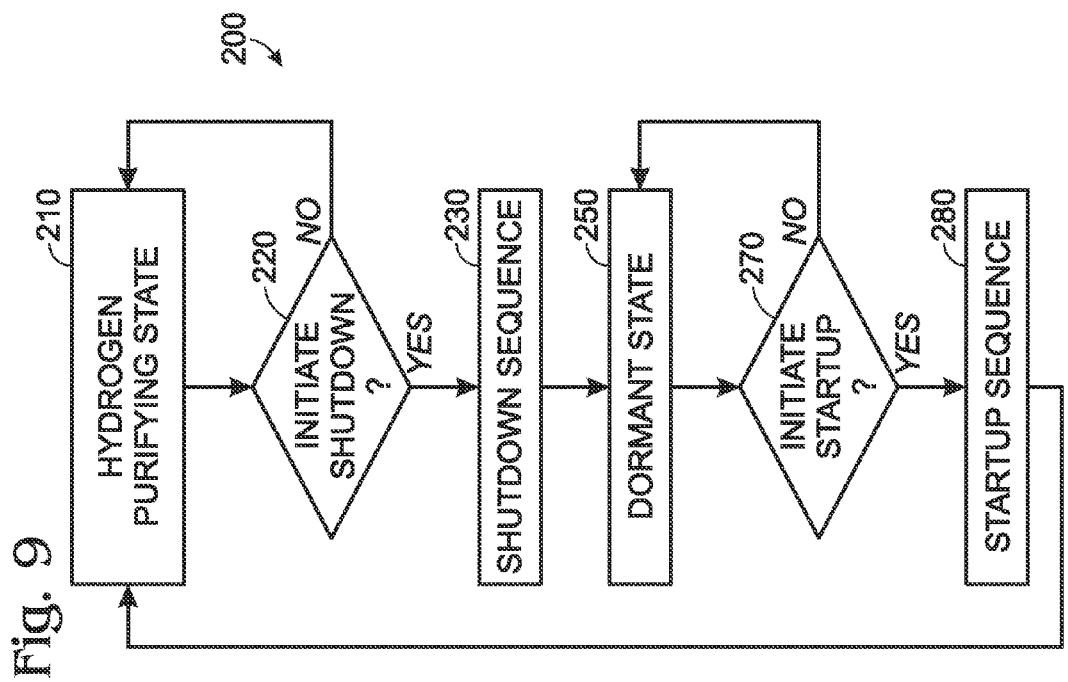
FIG. 9 is a flowchart depicting an illustrative, non-exclusive example of an overall operating sequence that may be used with PSA assemblies according to the present disclosure.

The hydrogen purifying operating state of the PSA assembly has been discussed previously. A detailed discussion is now provided of illustrative, non-exclusive examples of methods that provide for rapid startup of the PSA assembly and which may be used within the scope of the present disclosure. The flowchart of FIG. 9 provides an illustrative, non-exclusive example of an overall PSA assembly operating sequence 200 that may be implemented according to the present disclosure. While the method can be applied beginning at any point in the operating sequence, the following discussion begins with the PSA assembly in a hydrogen purifying (operating) state 210. The PSA assembly continues to run in the hydrogen purifying state until it receives a command to initiate shutdown 220. At this point, the system performs a shutdown sequence 230 and then enters a dormant state 250. The PSA assembly remains in the dormant state until it receives a command to initiate startup 270. The assembly proceeds to perform a startup sequence 280 and then begins running in hydrogen purifying state 210.

Figure 10:
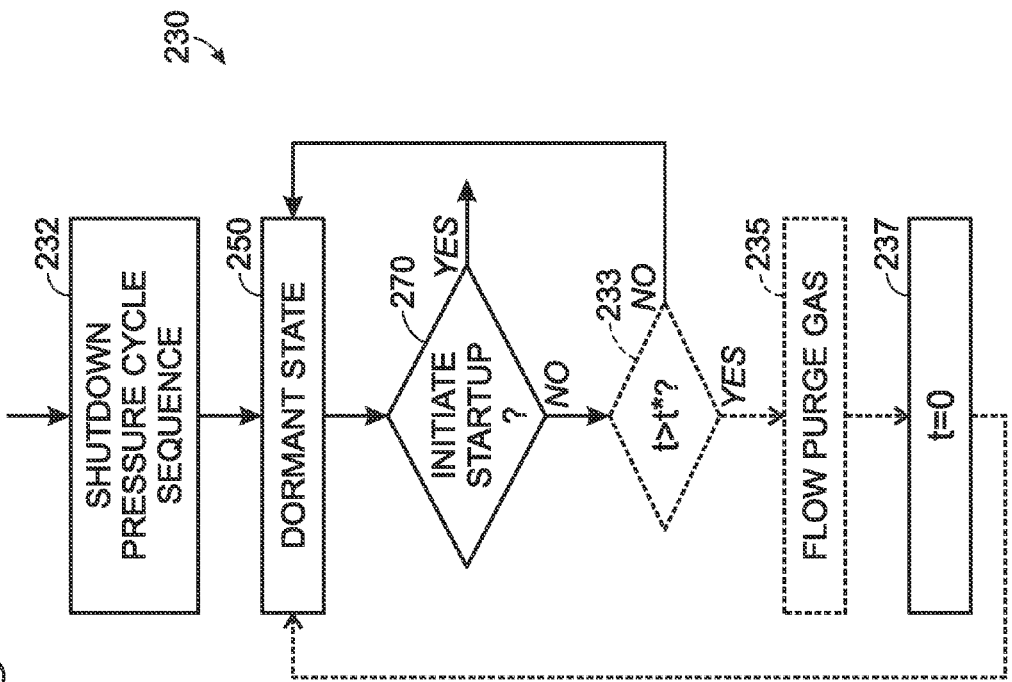
FIG. 10 is a flowchart representing an illustrative, non-exclusive example of a shutdown sequence that places a PSA assembly in a depressurized dormant state that may be used according to the present disclosure.
Figure 11:
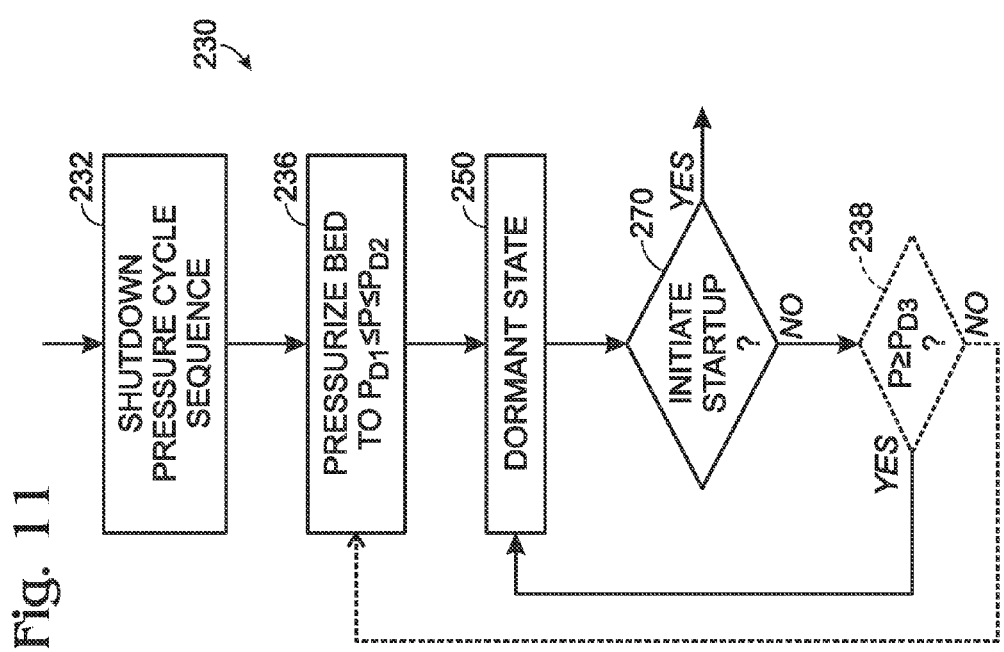
FIG. 11 is a flowchart representing an illustrative, non-exclusive example of a shutdown sequence that places a PSA assembly in a pressurized dormant state that may be used according to the present disclosure.

Illustrative, non-exclusive examples of shutdown sequences 230 that may be implemented according to the present disclosure are shown in FIGS. 10 and 11. In FIG. 10, the PSA assembly is placed in a depressurized dormant state, while in FIG. 11, the PSA assembly is placed in a pressurized dormant state. By "depressurized dormant state," it is meant that at least one of adsorbent beds 100 within PSA assembly 73 is placed at a pressure substantially at or below atmospheric pressure in preparation for the bed entering the dormant state. This may include pressures in the range of 0-30 psia, such as pressures in the range of 10-20 psia, 10-15 psia, 15-20 psia, 14-16 psia, etc. By "pressurized dormant state," it is meant that at least one of adsorbent beds 100 within PSA assembly 73 is placed at a pressure that is substantially above atmospheric pressure in preparation for the bed entering the dormant state. This may include pressures in the range of 25-185 psia, such as pressures in the range of 35-135 psia, 35-85 psia, 85-135 psia, 55-85 psia, etc. Pressures outside of the ranges listed for both the depressurized and the pressurized dormant state are within the scope of this disclosure, as are individual pressures within these illustrative ranges.

The preceding references to "placing" the adsorbent beds in a pressurized or depressurized dormant state include controlling the pressure in the beds to be at the selected pressure or within the selected pressure range. This may be implemented by any suitable controller and/or mechanism and may include selectively increasing or decreasing the pressure in the beds, Decreases in pressure may occur by removing gas from the beds. Increases in pressure may occur by positively adding gas to the beds. As discussed herein, this gas may (but is not required to) include or be purified hydrogen gas (such as from the product hydrogen stream), reformate gas, or an inert gas.

With reference to FIG. 10, PSA assembly shutdown sequence 230 includes performing a shutdown pressure cycle sequence 232 that ends with the bed being in a depressurized dormant state 250. Shutdown pressure cycle sequence 232 will be explained in more detail herein. Once the PSA assembly has been placed in the depressurized dormant state, it can remain in that state until a command 270 to initiate PSA startup sequence 280 has been received. Alternatively, as shown in dashed lines in FIG. 10, the dormant state may include the option of periodically flowing a purge gas through the PSA assembly in order to maintain a low concentration of contaminants within adsorbent beds 100. This may be accomplished, as indicated schematically at 233, through, for example, the use of an elapsed time counter that compares the current amount of time that the PSA assembly has been in a dormant state to a threshold time, t*. When the elapsed time, t, is greater than the threshold time, t*, purge gas 63 from purge gas source 65 (and/or optionally product hydrogen stream 66 from product hydrogen storage device 62) is allowed to flow through the PSA assembly for a period of time, as indicated in FIG. 10 at 235. Once the flow of purge gas has been completed, the elapsed time counter, t, is reset to zero, as indicated at 237, and the PSA assembly is placed back into the dormant state. The process may be repeated whenever the elapsed time since the last purge gas flow, t, is greater than the threshold time, t*.

With reference to FIG. 11, the illustrative, non-exclusive example of a PSA assembly shutdown sequence 230 includes performing a shutdown pressure cycle sequence 232 followed by pressurizing 236 the PSA assembly to a pressure, P, between a lower threshold value, $P_{D1}$ and an upper threshold value, $P_{D2}$, leaving the PSA assembly in a pressurized dormant state 250. Once the PSA assembly has been placed in the pressurized dormant state, it may remain in that state until a command 270 to initiate a PSA startup sequence has been received. Alternatively, as shown in dashed lines in FIG. 11, the dormant state may include the option of using a purge gas to maintain the pressure within the PSA assembly above a threshold level, $P_{D3}$. This is accomplished at 238 through the use of a pressure comparison that compares the current pressure in the PSA assembly to the threshold pressure, $P_{D3}$. If the pressure, P, in the PSA assembly is greater than $P_{D3}$, the bed remains in a dormant state. If the pressure, P, in the PSA assembly is less than $P_{D3}$, the system proceeds to bed pressurization step 236 before returning to dormant state 250. This cycle is repeated whenever the pressure in the PSA assembly, P, drops below the threshold pressure, $P_{D3}$.

It is within the scope of the present disclosure that, while in the dormant state, the adsorbent beds 100 within PSA assembly 73 may receive other intermittent and/or continuous treatments that will facilitate a rapid startup of the PSA assembly by facilitating the desorption of residual contaminants and/or decreasing the likelihood of new contaminant adsorption. For example, the PSA assembly may be heated, Alternatively or in combination, the adsorbent beds may be placed under vacuum. In addition, the methods detailed above represent only illustrative, non-exclusive embodiments. Other parameters besides time and pressure may be used to trigger a flow of gas and/or a repressurization of the PSA assembly, including but not limited to: a measured concentration of a specific gas chemistry or group of chemistries; measures of the ambient environment such as temperature, pressure, or relative humidity; time thresholds that are not constant (i.e., vary with the total amount of dormant time); or pressure thresholds that are not constant (i.e., vary with the total amount of dormant time).

Figure 12:
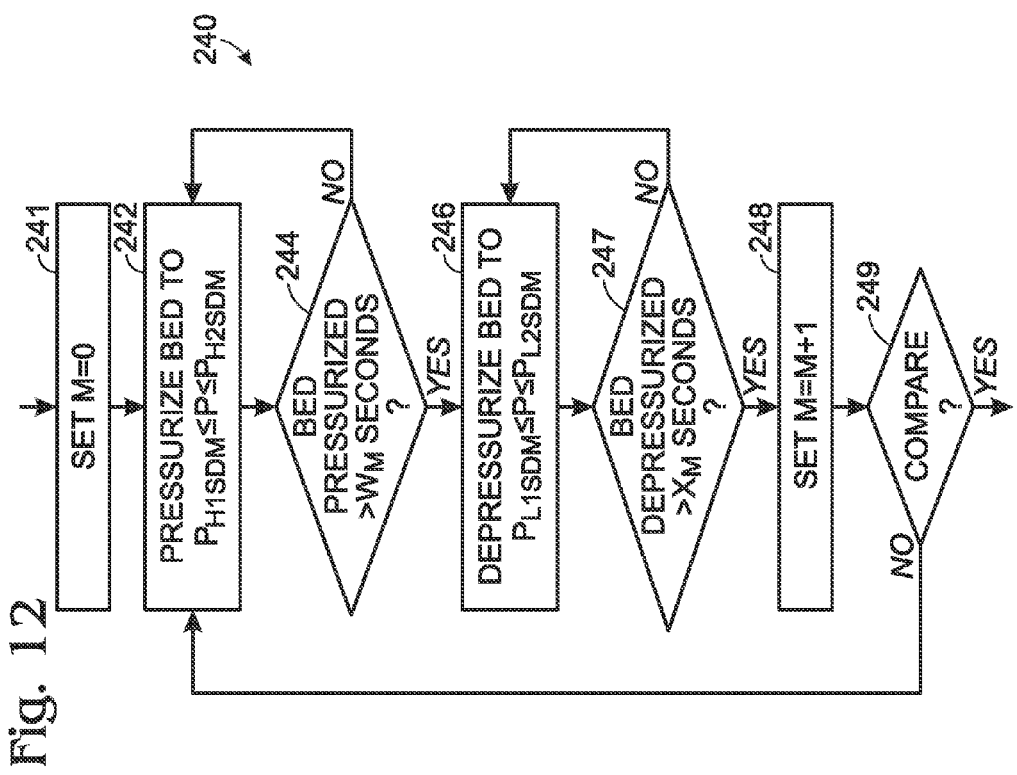
FIG. 12 is a flowchart representing an illustrative, non-exclusive example of a shutdown cycle sequence that may be used to clean adsorbents from a PSA bed prior to system shutdown according to the present disclosure.

An illustrative, non-exclusive example of a shutdown pressure cycle sequence that may be implemented according to the present disclosure is shown in FIG. 12 at 240 and proceeds as follows. First, a shutdown pressure cycle counter, M, is set equal to zero at 241. Then, the PSA assembly is pressurized to a pressure, P, between a first high pressure threshold at shutdown for cycle M, $P_{H1SDM}$, and a second high pressure threshold at shutdown for cycle M, $P_{H2SDM}$, at 242. The gas used to pressurize PSA assembly 73 during shutdown pressure cycle sequence 240 may come from a variety of sources, These sources may include, but are not limited to, product hydrogen stream 66, storage device 62, and purge gas source 65, The bed is maintained in this pressurized state for a total of $W_M$ seconds at 244 and then depressurized to a pressure, P, between a first low pressure threshold at shutdown for cycle M, $P_{L1SDM}$, and a second low pressure threshold at shutdown for cycle M, $P_{L2SDM}$, at 246. The bed is maintained in this depressurized state for a total of $X_M$ seconds at 247. Next, the pressure cycle counter, M, is incremented by one at 248. Finally, a comparison is made at 249. Depending on the result of the comparison at 249, the system either repeats shutdown pressure cycle sequence 240 or proceeds out of the pressure cycle sequence.

Comparison 249 compares a current value to a desired value to determine the next step in the process. For example, if shutdown pressure cycle sequences are to be performed a total of $M_T$ times, comparison 249 compares the current value of M to $M_T$, for example is $M > M_T$? If the answer is no, the desired number of pressure cycles have not been completed and the system proceeds to step 242 as shown in FIG. 12. Alternatively, if the answer is yes, the desired number of pressure cycles has been completed and the system proceeds out of the pressure cycle sequence. As another illustrative, non-exclusive example, the shutdown pressure cycle sequences may be configured to repeat until the concentration, C, of a gas component within adsorbent beds 100 is below a threshold level, C*. In this case, comparison 249 may check that C<C* and then proceed as described above. The gas component may be or include carbon monoxide, carbon dioxide, water vapor, or any other relevant contaminant or combination of contaminants found in adsorbent beds 100.

It is within the scope of the present disclosure that comparison 249, additionally or alternatively, may compare relevant parameters other than those listed, may make a differential comparison between a parameter measured in one portion of the system to a parameter measured in another portion of the system, and/or may make nested comparisons such as ensuring that a measured concentration is below a threshold level and that a desired minimum or maximum number of shutdown pressure cycles have been completed. Likewise, while the illustrative, non-exclusive example depicted in FIG. 12 utilizes counter steps 241 and 248, it is within the scope of the present disclosure that other methods and/or mechanisms for regulating the number of shutdown cycle sequences may be utilized. It is also with the scope of the present disclosure for the method of FIG. 12 to not utilize a predetermined number of shutdown cycle sequences, such as when comparison 249 is based on concentration C, in which case steps 241 and 249 are optional or may not be utilized.

As indicated by their index in FIG. 12, it is within the scope of the present disclosure that each of the M bed pressurization and depressurization steps to be performed may have the same or different high pressure thresholds $P_{H1SDM}$ and $P_{H2SDM}$, high pressure dwell times $W_M$, low pressure thresholds $P_{L1SDM}$ and $P_{L2SDM}$, and low pressure dwell times $X_M$. In addition and as detailed above, the total number of shutdown pressure cycles may be a fixed number $M_T$ or may vary based on measurements performed on PSA assembly 73. In addition, the method of FIG. 12 is purely exemplary and any other PSA assembly purge methodology may be used without departing from the scope of this disclosure, including but not limited to: pressure ramp, pressure ramp and soak, pressure cycles that follow a sinusoidal or other cyclical/periodic behavior, and/or purging at a fixed, or substantially fixed, pressure or flow rate.

Figure 13:
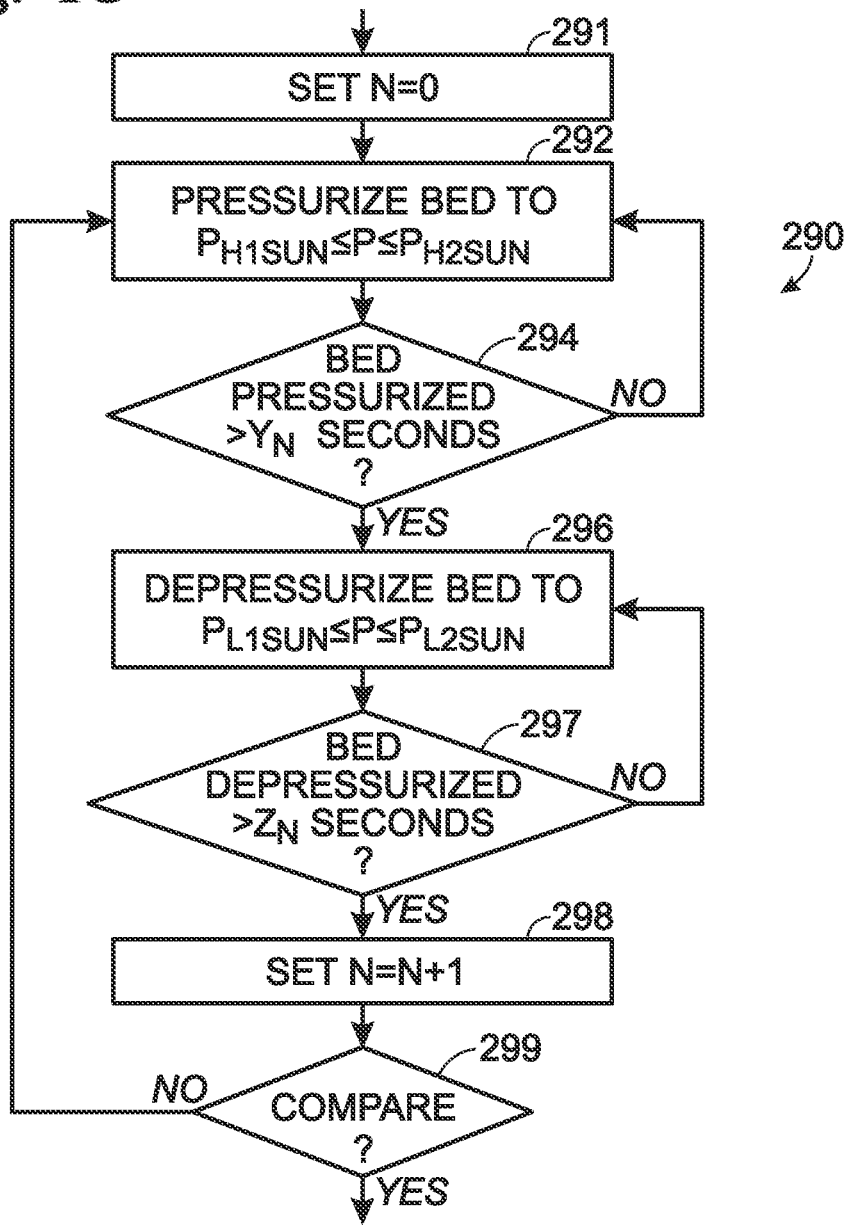
FIG. 13 is a flowchart representing an illustrative, non-exclusive example of a startup cycle sequence that may be used to clean adsorbents from a PSA bed during system startup according to the present disclosure.

FIG. 13 shows an illustrative, non-exclusive example of a startup pressure cycle sequence 290 that may be implemented according to the present disclosure. The structure of startup pressure cycle sequence 290 is analogous to that of shutdown pressure cycle sequence 240, with steps 291, 292, 294, 296, 297, 298, and 299 of the corresponding startup pressure cycle sequence corresponding generally to steps 241, 242, 244, 246, 247, 248, and 249 of the previously discussed shutdown pressure cycle sequence, with two noteworthy exceptions.

First, the threshold values are specific to startup pressure cycle sequence 290. Thus, for startup pressure cycle sequence 290, $P_{H1SUN}$ and $P_{H2SUN}$ are the first and second high pressure thresholds at startup for cycle N respectively, $Y_N$ is the time that the bed is maintained in a pressurized state for startup cycle N, $P_{L1SUN}$ and $P_{L2SUN}$ are the first and second low pressure thresholds at startup for cycle N respectively, $Z_N$ is the time that the bed is maintained in a depressurized state for startup cycle N, and $N_T$ is the total number of startup pressure cycles desired, if used.

Second, the source of gas used to pressurize the PSA assembly may be different. Specifically, since the startup of PSA assembly 73 may proceed at least partially in parallel with the startup of hydrogen-producing region 70, product hydrogen stream 66 or another source of hydrogen gas may not initially be available for use in charging adsorbent beds 100 with hydrogen gas. Thus, the hydrogen source for the startup pressure cycle sequence may be, or may include, at least one of hydrogen storage device 62, purge gas source 65, or a portion of mixed gas stream 74. Use of mixed gas stream 74 as a hydrogen gas source for startup pressure cycle sequences may include using the entire mixed gas stream for pressure cycle sequences, and optionally may include using the mixed gas stream produced during reduced-output operating states of the reformer or other hydrogen generation assembly. As a further option, a portion of the mixed gas stream may be used for pressure cycle sequences, and a portion of the mixed gas stream may be used for other purposes, such as a fuel for heating assembly 71. In addition, after initially charging the PSA assembly with mixed gas stream 74, any fraction of the hydrogen gas produced by the PSA assembly as product hydrogen stream 66 may then be used as a purge gas for the PSA assembly.

The overall time duration of pressure cycles in startup pressure cycle sequence 290, as well as the length of time that the bed remains in the pressurization, pressurized, depressurization, depressurized, equalization, and/or purge states, may be the same as or different from the duration of PSA pressure cycles associated with the hydrogen purifying state. For example, the startup pressure cycle sequences may be shorter than the pressure cycles associated with the hydrogen purifying state. Illustrative, non-exclusive examples of shorter startup pressure cycle sequence times include times that are 5% to 95% of the corresponding hydrogen purifying state times, including times that are 30%, 40%, 50%, 60%, 70%, and/or that are in the range of 25-75%, 35-65%, or 40-60% of the corresponding hydrogen purifying state times. Longer startup pressure cycles sequence times are also within the scope of the present disclosure, including times that are 101% to 1000% of the corresponding hydrogen purifying state times. Times that are shorter or longer than these illustrative, non-exclusive examples are also within the scope of the present disclosure. These time variations also may apply to shutdown pressure cycle sequence 240, discussed previously.

The flow rate and overall amount of purge gas utilized during an individual startup pressure cycle may be the same as or different from the corresponding flow rate and overall volume of purge gas utilized in the hydrogen purifying state. For example, when in the hydrogen purifying state, a specific fraction of product hydrogen stream 66 may be utilized as a purge gas for the PSA assembly. This may include fractions in the range of 5% to 95%, including 30%, 40%, 50%, 60%, 70%, 25-75%, 35-65%, and 40-60% of the product hydrogen stream. A PSA startup pressure cycle sequence according to the present disclosure that purifies the mixed gas stream and then utilizes the resultant product hydrogen stream as a purge gas may use significantly more of the product hydrogen stream, up to and including 100% of the product hydrogen stream, as a purge gas for the PSA assembly. Additionally or alternatively, a PSA startup pressure cycle sequence according to the present disclosure may utilize a volume of purge gas, such as up to and including 100%, 150%, 200% or more of the volume of purge gas used during the purge steps of the PSA cycle in the hydrogen purifying state. Thus, in some such sequences, the cycle time during the startup sequences may be reduced and the volume of purge gas may be increased, relative to the time and volume used by the PSA assembly during the hydrogen purifying state. Flow rates and overall flows outside (i.e., greater than or less than) those listed above are also within the scope of the present disclosure and these flow rate and overall volume variations also may apply to shutdown pressure cycle sequence 240, discussed previously.

Figure 14:
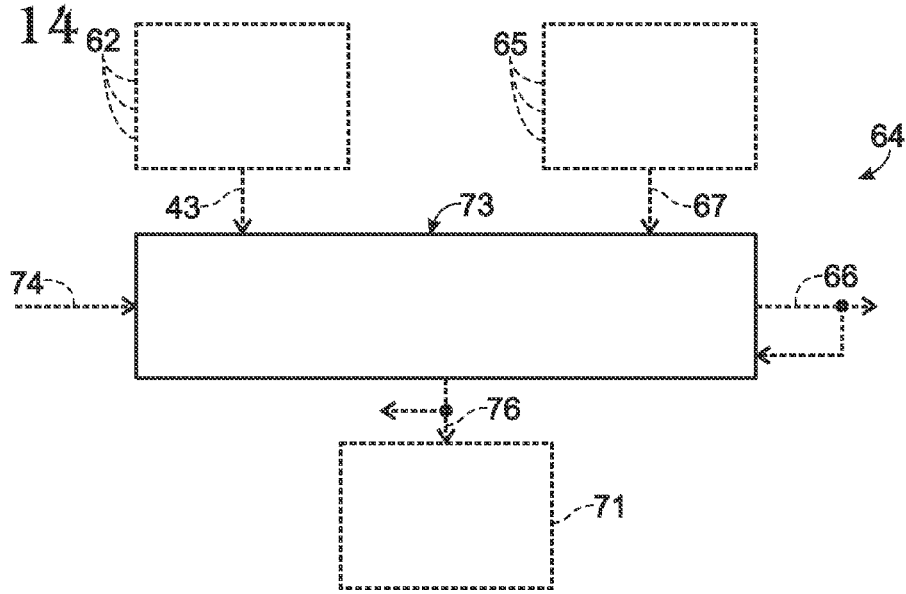
FIG. 14 is a schematic view of the stream flows that may be associated with a PSA assembly according to the present disclosure while the PSA assembly is in a startup state.

An illustrative, non-exclusive startup configuration for the PSA assembly is shown in FIG. 14. In FIG. 14, PSA assembly 73 is shown to be in optional fluid communication with a variety of streams. All streams are shown as optional since the specific configuration may vary with specific system installation, system design, and/or system status. To facilitate a rapid startup, a substantially pure hydrogen source, such as hydrogen storage device 62 and/or purge gas source 65, may be used to charge PSA assembly 73 with hydrogen gas. Additionally or alternatively, product hydrogen stream 66, when available, may be directed into the PSA assembly for use as a purge gas stream, as shown in the FIG. 14.

In some startup configurations according to the present disclosure, mixed gas stream 74 may be unavailable or only available in limited supply due to the concurrent startup of hydrogen-producing region 70. Thus, at least one of hydrogen storage device 62 and purge gas source 65 may be used to supply substantially pure hydrogen gas to the PSA assembly at startup via PSA hydrogen delivery stream 43 and PSA purge gas supply stream 67 respectively. The supplied hydrogen gas may be used to perform startup pressure cycle sequence 290, such as previously described with respect to FIG. 13, and then discharged from the PSA assembly via byproduct stream 76. Byproduct stream 76 may contain hydrogen gas and may have sufficient fuel value to be used as a fuel source. Thus, byproduct stream 76 may be utilized in another hydrogen-consuming device or process, such as temperature modulating assembly 71, stored for later use, or discharged from the system.

In some startup configurations according to the present disclosure, after mixed gas stream 74 becomes available from hydrogen-producing region 70, mixed gas stream 74 may additionally or alternatively be used to pressurize PSA assembly 73. Resultant product hydrogen stream 66 may be directed back into the PSA assembly, for use as a purge gas in performing startup pressure cycle sequence 290, as schematically illustrated in FIG. 14, and then discharged from the PSA assembly via byproduct stream 76. The use of mixed gas stream 74 to pressurize the PSA assembly allows the PSA assembly to produce its own purge gas and startup without the need for either hydrogen storage device 62 or purge gas source 65.

In some fuel processing systems 64, only one of hydrogen storage device 62 or purge gas source 65 may be present. However, as shown in dashed lines in FIG. 14, it is within the scope of the present disclosure that a fuel processing system 64 may include both hydrogen storage device 62 and purge gas source 65. As also shown in FIG. 14, it is within the scope of the present disclosure that fuel processing system 64 may contain a plurality of hydrogen storage devices 62 and/or purge gas sources 65. While the system of FIG. 1 shows both hydrogen storage device 62 and purge gas source 65 as being external to fuel processing system 64 but contained within energy-producing system 22, the specific location of hydrogen storage device 62 and purge gas source 65 is not critical or required to the details of this disclosure as long as at least one of hydrogen storage device 62 and purge gas source 65 is in fluid communication with PSA assembly 73.

In the above discussion, the pressure, P, in PSA assembly 73 refers to a representative pressure within the PSA assembly. This pressure may be the average pressure in all of adsorbent beds 100, the average pressure in one or more selected or representative adsorbent beds 100, the pressure in an individual adsorbent bed 100, the minimum pressure from a series of pressure measurements within all or select adsorbent beds 100, the maximum pressure from a series of pressure measurements within all or select adsorbent beds 100, the pressure in distribution assembly 102 or 104, a differential pressure measurement, or any other pressure that is selected as representative of the pressure within the entire PSA assembly or within components thereof.

Similarly, when a method refers to pressurizing and/or depressurizing PSA assembly 73, it is within the scope of the present disclosure that the PSA assembly will typically include two or more adsorbent beds 100 and that, depending on the system configuration, it may or may not be possible and/or desirable to pressurize and/or depressurize all of the adsorbent beds simultaneously. Thus, a step involving pressurizing or depressurizing the PSA assembly may involve pressurizing or depressurizing all adsorbent beds and associated distribution assemblies at one time or it may involve sequential pressurization or depressurization of individual components. It is also within the scope of this disclosure that one or more of a plurality of adsorbent beds within the PSA assembly may not receive the same pressurization or depressurization treatment as other beds within the PSA assembly. This may be true if, for example, the PSA assembly is constructed of a relatively large number of adsorbent beds and it is not necessary to provide a rigorous shutdown, dormant, and startup treatment to all beds in order to ensure the rapid availability of the PSA assembly as a whole upon system startup. In addition, it is within the scope of the present disclosure that a PSA assembly controller, which may form a portion of a hydrogen-generation assembly and/or energy-producing system according to the present disclosure, may be adapted to detect a parameter related to the status of a particular adsorbent bed 100 within PSA assembly 73 and be configured to selectively change the order in which individual adsorbent beds 100 are transitioned from a startup state to a hydrogen-purifying state based on the detected status. For example, the PSA assembly controller may detect the concentration of carbon monoxide, carbon dioxide, water, or another relevant contaminant within individual adsorbent beds 100 and selectively transition the beds from a startup state to a hydrogen-purifying state once the concentration is below a threshold level.

The illustrative, non-exclusive examples and methods described above may be utilized individually via shutdown, dormant, and/or startup treatments that will minimize the overall startup time of the hydrogen-generation assembly; however they also may be utilized in combination and/or with other methods and/or treatments. In addition, while the PSA startup sequences are frequently described herein as being performed substantially in parallel with (or concurrently with) the startup of the hydrogen-producing region through the use of stored purge gas source 62 or 65, it is within the scope of the present disclosure that reformate from the hydrogen-producing region may be used to charge the PSA assembly at startup, The following illustrative, non-exclusive examples describe combination methods that may be utilized to minimize the startup time of the PSA assembly. The following examples are intended for the purpose of illustration, and not limitation, and it is within the scope of the present disclosure that other methods may be utilized, that the following illustrative examples may be used alone, in combination with one or more of the other examples, and/or in combination with one or more other steps or processes, such as those that are otherwise disclosed herein.

EXAMPLE 1

At shutdown, product hydrogen stream 66 is used to perform shutdown cycling and remove contaminants from the PSA assembly. The PSA assembly is pressurized with product hydrogen stream 66 to place the PSA assembly in a pressurized dormant state. At startup, startup cycling is performed using (substantially pure) hydrogen gas from either or both of storage device 62 or purge gas source 65.

EXAMPLE 2

At shutdown, product hydrogen stream 66 is used to perform shutdown cycling and remove contaminants from the PSA assembly. The PSA assembly is placed in a depressurized dormant state. At startup, startup cycling is performed using (substantially pure) hydrogen gas from either or both of storage device 62 or purge gas source 65. In experiments using the method of Example 2, shortened shutdown and startup sequences, or cycles, were performed, such as provided for herein, and purified hydrogen gas from a hydrogen storage device (such as which contained purified hydrogen gas produced by the fuel processing system prior to shutdown of a prior operating state thereof) and within two minutes of initiating the startup sequence for the PSA assembly, the concentration of carbon dioxide exiting the PSA assembly was less than 2 ppm (parts per million).

EXAMPLE 3

At shutdown, product hydrogen stream 66 is used to perform shutdown cycling and remove contaminants from the PSA assembly. The PSA assembly is pressurized with product hydrogen stream 66 to place the PSA assembly in a pressurized dormant state. At startup, startup cycling is performed using reformate gas produced by the hydrogen-producing region of the hydrogen-generation assembly.

EXAMPLE 4

At shutdown, product hydrogen stream 66 is used to perform shutdown cycling and remove contaminants from the PSA assembly, The PSA assembly is placed in a depressurized dormant state. At startup, startup cycling is performed using reformate gas produced by the hydrogen-producing region of the hydrogen-generation assembly. In experiments using the method of Example 4, shortened shutdown and startup sequences, or cycles, were performed, such as provided for herein in which reformate gas was used for the shortened startup cycles. Due to the reformate stream being delivered while startup of the reformer also was occurring, the pressure of this stream increased over time to a desired delivery pressure, such as 80 psig. Within seven minutes of initiating the startup of the PSA assembly, the concentration of carbon monoxide was less than 2 ppm, While longer than the experiments performed in accordance with Example 2, the time is still noticeably less than if the reformer and PSA assembly were started up sequentially, or in series.

EXAMPLE 5

At shutdown, product hydrogen stream 66 is used to perform reduced cycle time shutdown pressure cycling and remove contaminants from the PSA assembly. In this example, the overall PSA shutdown cycle time is 50% of the cycle time associated with the hydrogen purifying state and 100% of the product hydrogen stream is utilized as a purge gas for the PSA assembly. Individual PSA adsorbent beds 100 are purged and cleaned sequentially such that, as one bed is producing hydrogen gas, the next bed is being purified by the produced hydrogen gas. The PSA assembly is then placed in a depressurized dormant state.

EXAMPLE 6

At startup, an adsorbent bed is charged with mixed gas stream 74, when it becomes available. Although not required, this Example may be used in conjunction with a PSA assembly that was shutdown according to Example 5, and further optionally, the last adsorbent bed to be purged during the shutdown pressure cycle is the first adsorbent bed to be charged with mixed gas stream 74.

EXAMPLE 7

Similar to shutdown, at startup, reduced cycle time startup pressure cycling is performed in which the cycle time is 50% of the cycle time associated with the hydrogen purifying state, 100% of the product hydrogen stream is utilized as a purge gas for the PSA assembly, and the beds are purged sequentially, with the product hydrogen gas produced by one bed being used to purge the next bed in series. The cycle is repeated until a desired number of cycles have been completed and/or the concentration of contaminants in the product hydrogen stream is below a threshold level.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method for starting up a hydrogen-generation assembly that includes a hydrogen-producing region (HPR) and a pressure swing adsorption (PSA) assembly, the hydrogen-producing region having HPR hydrogen-producing, HPR shutdown, HPR dormant, and HPR startup states, the PSA assembly having PSA hydrogen-purifying, PSA shutdown, PSA dormant, and PSA startup states, and the PSA assembly further having an internal pressure, the method comprising:

supplying a feedstock supply stream to the hydrogen-generation assembly while in the HPR hydrogen-producing state to produce a mixed gas stream containing hydrogen gas as a majority component and further containing other gases;

supplying the mixed gas stream to the PSA assembly while in the PSA hydrogen-purifying state to produce a product hydrogen stream having a greater concentration of hydrogen gas and/or a lower concentration of the other gases than the mixed gas stream;

utilizing a HPR shutdown sequence to transition the HPR from the HPR hydrogen-producing state to the HPR dormant state and utilizing a PSA shutdown sequence to transition the PSA assembly from the PSA hydrogen-purifying state to the PSA dormant state;

utilizing a HPR startup sequence to transition the HPR from the HPR dormant state to the HPR hydrogen-producing state and utilizing a PSA startup sequence to transition the PSA assembly from the PSA dormant state to the PSA hydrogen-purifying state, wherein at least the PSA startup sequence includes supplying hydrogen gas to the PSA assembly from a hydrogen source other than the HPR after the HPR has completed the HPR startup sequence.

A2. The method of paragraph A1, wherein the utilizing the PSA startup sequence includes utilizing the PSA startup sequence at least partially concurrently with the HPR startup sequence.

B1. A method for starting up a hydrogen-generation assembly that includes a hydrogen-producing region (HPR) and a pressure swing adsorption (PSA) assembly, the hydrogen-producing region having HPR hydrogen-producing, HPR shutdown, HPR dormant, and HPR startup states, the PSA assembly having PSA hydrogen-purifying, PSA shutdown, PSA dormant, and PSA startup states, and the PSA assembly further having an internal pressure, the method comprising:

supplying a feedstock supply stream to the hydrogen-generation assembly while in the HPR hydrogen-producing state to produce a mixed gas stream containing hydrogen gas as a majority component and further containing other gases;

supplying the mixed gas stream to the PSA assembly while in the PSA hydrogen-purifying state to produce a product hydrogen stream having a greater concentration of hydrogen gas and/or a lower concentration of the other gases than the mixed gas stream;

utilizing a HPR shutdown sequence to transition the HPR from the HPR hydrogen-producing state to the HPR dormant state and utilizing a PSA shutdown sequence to transition the PSA assembly from the PSA hydrogen-purifying state to the PSA dormant state; and utilizing a HPR startup sequence to transition the HPR from the HPR dormant state to the HPR hydrogen-producing state and utilizing a PSA startup sequence to transition the PSA assembly from the PSA dormant state to the PSA hydrogen-purifying state, wherein at least the PSA startup sequence includes supplying hydrogen gas to the PSA assembly from a hydrogen source, and further wherein the utilizing the PSA startup sequence includes utilizing the PSA startup sequence at least partially concurrently with the HPR startup sequence.

B2. The method of any of paragraphs A1-B1, wherein the PSA startup sequence is started at the same time as the HPR startup sequence.

B3. The method of any of paragraphs A1-B2, wherein the PSA startup sequence is started so that it completes at, or optionally at substantially at, the same time as the HPR startup sequence.

B4. The method of any of paragraphs A1-B3, wherein the hydrogen source includes a hydrogen storage device that includes a volume of hydrogen gas.

B5. The method of paragraph B4, wherein the hydrogen storage device includes a pressurized tank.

B6. The method of paragraph B4, wherein the hydrogen storage device includes a gas reservoir.

B7. The method of any of paragraphs B4-B6, wherein the method includes charging the hydrogen storage device with hydrogen gas by delivering at least a portion of the product hydrogen stream produced when the PSA assembly is in the PSA-hydrogen-purifying state.

B8. The method of any of paragraphs B4-B6, wherein the method includes charging the hydrogen storage device with hydrogen gas by delivering at least a portion of the mixed gas stream produced by the HPR when the HPR is in the hydrogen-producing state.

B9. The method of paragraph B4, wherein the hydrogen storage device includes at least one hydride bed containing a hydrogen storage media.

B10. The method of paragraph B9, wherein at least a portion of the product hydrogen stream produced when the PSA assembly is in the PSA hydrogen-purifying state is stored into the hydrogen storage media to charge the hydrogen source with hydrogen.

B11. The method of paragraph B10, wherein the method includes using a heat source to heat the hydrogen source to supply an endothermic heat of desorption necessary to desorb the hydrogen gas from the hydrogen storage media.

B12. The method of paragraph B11, wherein the heat source includes one or more of an electric heater, a reformer exhaust stream, a fuel cell stack coolant stream, a hot air stream from a cabinet heater, another heat source associated with the fuel cell system, and another external heat source available to the fuel cell system.

B13. The method of any of paragraphs A1-B12, wherein the hydrogen source includes a bulk hydrogen storage device selected from one or more of a gaseous hydrogen storage tank and a liquid hydrogen storage tank.

B14. The method of paragraph B13, wherein at least a portion of the product hydrogen stream produced when the PSA assembly is in the PSA hydrogen-purifying state is stored in the bulk hydrogen storage device.

B15. The method of any of paragraphs A1-B14, wherein the hydrogen source includes a chemical reaction that generates hydrogen gas as a product or byproduct stream.

B16. The method of paragraph B15, wherein the chemical reaction is selected from the group comprising reacting water with aluminum/gallium, reacting water with magnesium, reacting methanol-water with hydrogen peroxide over a suitable catalyst, or decomposing a chemical hydride such as sodium borohydride.

B17. The method of any of paragraphs A1-B16, wherein the hydrogen source includes the HPR when the HPR is not in its hydrogen-producing state, and optionally wherein the hydrogen source includes the HPR when the HPR is in its HPR startup state.

B18. The method of any of paragraphs A1-B17, wherein the PSA shutdown sequence includes at least one of stopping the flow of the mixed gas stream to and stopping the flow of the product hydrogen stream from the PSA assembly.

B19. The method of any of paragraphs A1-B18, wherein the PSA shutdown sequence includes performing at least one purge cycle that involves supplying a purge gas stream to the PSA assembly to increase the internal pressure of the PSA assembly to a first pressure, maintaining the internal pressure at the first pressure for a first time period, decreasing the internal pressure of the PSA assembly to a second pressure by discharging gas within the PSA assembly to a byproduct stream, maintaining the internal pressure at the second pressure for a second time period; and repeating the purge cycle.

B20. The method of paragraph B19, wherein the product hydrogen stream forms at least a portion of the purge gas stream.

B21. The method of paragraph B19, wherein the number of purge cycles is a predetermined, or fixed, number.

B22. The method of paragraph B19, wherein the number of purge cycles is based on a measurement of a characteristic of the PSA assembly or the purge gas stream.

B23. The method of paragraph B22, wherein the characteristic is the concentration of at least one of carbon monoxide, carbon dioxide, or water in the byproduct stream leaving the PSA assembly.

B24. The method of paragraph B19, wherein at least one of the first time period and the second time period is different from the corresponding time periods associated with the PSA hydrogen-purifying state.

B25. The method of paragraph B24, wherein at least one of the first time period and the second time period is less than the corresponding time periods associated with the PSA hydrogen-purifying state.

B26. The method of any of paragraphs A1-B25, wherein the PSA shutdown sequence includes a continuous flow of purge gas through adsorbent beds of the PSA assembly for a third time period.

B27. The method of paragraph B26, wherein the third time period is a predetermined, or fixed, period of time.

B28. The method of paragraph B26, wherein the third time period is based on a measurement of a characteristic of the adsorbent beds or byproduct stream.

B29. The method of paragraph B28, wherein the characteristic is the concentration of at least one of carbon monoxide, carbon dioxide, or water in the byproduct stream leaving the PSA assembly.

B30. The method of paragraph B26, wherein the product hydrogen stream forms at least a portion of the purge gas stream.

B31. The method of any of paragraphs A1-B30, wherein, in the dormant state, the internal pressure within the PSA assembly is, or is at least substantially, atmospheric pressure and further wherein the method includes placing the PSA assembly at the internal pressure during the HPR shutdown sequence.

B32. The method of any of paragraphs A1-B31, wherein, in the dormant state, the internal pressure within the PSA assembly is greater than atmospheric pressure.

B33. The method of paragraph B32, wherein the method includes pressurizing the PSA assembly by charging the PSA assembly with hydrogen gas during and/or after the PSA shutdown sequence.

B34. The method of any of paragraphs A1-B33, wherein the method further comprises periodically supplying hydrogen gas to the PSA assembly when the PSA assembly is in the dormant state, and optionally periodically supplying the hydrogen gas from the hydrogen source.

B35. The method of paragraph B34, wherein the periodically supplying includes supplying hydrogen gas to periodically purge the PSA assembly while maintaining the internal pressure at, or at least substantially at, atmospheric pressure.

B36. The method of paragraph B34, wherein the periodically supplying includes supplying hydrogen gas to maintain the internal pressure within the PSA assembly above a threshold pressure.

B37. The method of any of paragraphs A1-B36, wherein the PSA startup sequence includes performing at least one purge cycle that involves supplying the startup hydrogen stream to the PSA assembly to increase the internal pressure of the PSA assembly, maintaining the internal pressure for a time period, decreasing the internal pressure of the PSA assembly by discharging gas within the PSA assembly to a byproduct stream, maintaining the internal pressure for a further time period;

repeating the purge cycle at least once; and supplying the startup hydrogen stream to the PSA assembly to increase the internal pressure of the PSA assembly.

B38. The method of any of paragraphs A1-B36, wherein the PSA startup sequence includes performing at least one purge cycle that involves supplying the startup hydrogen stream to the PSA assembly to increase the internal pressure of the PSA assembly to a third pressure, maintaining the internal pressure at the third pressure for a fourth time period, decreasing the internal pressure of the PSA assembly to a fourth pressure by discharging gas within the PSA assembly to a byproduct stream, maintaining the internal pressure at the fourth pressure for a fifth time period;

repeating the purge cycle at least once; and supplying the startup hydrogen stream to the PSA assembly to increase the internal pressure of the PSA assembly to a fifth pressure.

B39. The method of paragraph B38, wherein the number of purge cycles is a predetermined or fixed number.

B40. The method of paragraph B38, wherein the number of purge cycles is based on a measurement of a characteristic of the PSA assembly or the byproduct stream.

B41. The method of paragraph B40, wherein the characteristic is the concentration of at least one of carbon monoxide, carbon dioxide, or water in the byproduct stream leaving the PSA assembly.

B42. The method of paragraph B38, wherein at least one of the fourth time period and the fifth time period are different from the corresponding time periods associated with the PSA hydrogen-purifying state.

B43. The method of paragraph B42, wherein at least one of the fourth time period and the fifth time period are less than the corresponding time periods associated with the PSA hydrogen-purifying state.

B44. The method of paragraph B38, wherein the byproduct stream is combusted in a temperature modulating assembly to produce a byproduct heat stream.

B45. The method of paragraph B44, wherein the byproduct heat stream is used to heat the hydrogen-producing region of the hydrogen-generation assembly.

B46. The method of paragraph B38, wherein the PSA startup sequence includes a continuous flow of the startup hydrogen stream through the adsorbent beds for a sixth time period.

B47. The method of paragraph B46, wherein the sixth time period is a predetermined, or fixed, period of time.

B48. The method of paragraph B46, wherein the sixth time period is based on a measurement of a characteristic of the PSA assembly or the byproduct stream.

B49. The method of paragraph B48, wherein the characteristic is the concentration of at least one of carbon monoxide, carbon dioxide, or water in the byproduct stream leaving the PSA assembly.

B50. The method of any of paragraphs A1-B49, wherein the method includes delivering at least a portion, and optionally all, of the product hydrogen stream to a hydrogen-consuming device.

B51. The method of paragraph B50, wherein the hydrogen-consuming device includes a fuel cell stack.

B52. The method of paragraph B51, wherein the hydrogen source is configured to supply hydrogen gas to the fuel cell system when the pressure swing adsorption assembly is in the PSA startup state and not producing the product hydrogen stream.

B53. The method of paragraph B51, wherein the hydrogen source is configured to supply hydrogen gas to a fuel cell system when the pressure swing adsorption assembly is in the PSA hydrogen-purifying state but is unable to meet the hydrogen demand of the fuel cell system.

B54. The method of any of paragraphs A1-B53, wherein the method further includes delivering at least a portion, and optionally all, of the product hydrogen stream for reaction in a hydrogen-consuming chemical reaction.

B55. The method of any of paragraphs A1-B54, wherein the hydrogen generation assembly is selected from the group comprising a steam reformer, a partial oxidation reactor, and an autothermal reformer.

B56. The method of any of paragraphs A1-B55, wherein the utilizing a HPR startup sequence, the utilizing the PSA startup sequence, and the supplying a startup hydrogen stream occur prior to the supplying the feedstock supply stream, the supplying the mixed gas stream, the utilizing the HPR shutdown sequence, and the utilizing the PSA shutdown sequence.

C1. The use of the method of any of paragraphs A1-B56 to facilitate rapid startup of a fuel processing system.

C2. The use of the method of any of paragraphs A1-B56 to facilitate rapid startup of a PSA assembly.

D1. A hydrogen-producing system configured to utilize the methods of any of paragraphs A1-B56.

D2. The hydrogen-producing system of paragraph D1, wherein the hydrogen producing system includes a controller configured to implement the methods of any of paragraphs A1-B56.

D3. The hydrogen-producing system of paragraph D1 or D2, wherein the hydrogen-producing system includes a hydrogen-generation assembly that includes a hydrogen-producing region (HPR) and a pressure swing adsorption (PSA) assembly.

D4. A hydrogen-producing fuel cell system configured to utilize the methods of any of paragraphs A1-B56.

D5. The hydrogen-producing fuel cell system of paragraph D4, wherein the hydrogen-producing fuel cell system includes a fuel cell stack and a hydrogen-producing fuel processing system of any of paragraphs D1-D3.

D6. The hydrogen-producing fuel cell system of paragraph D4 or D5, further comprising a controller configured to implement the methods of any of paragraphs A1-B56.

E1. Control means for controlling at least one of startup and shutdown of a hydrogen-generation assembly utilizing the method of any of paragraphs A1-B56.

E2. A controller configured to control at least one of startup and shutdown of a hydrogen-generation assembly utilizing the method of any of paragraphs A1-B56.

E3. The controller of paragraph E2, wherein the controller is a computer-implemented controller.

E4. The controller of paragraph E2, wherein the controller is a computerized controller.

F1. A hydrogen-generation assembly, comprising:
a fuel processing system with a hydrogen-producing region adapted to produce from a feedstock supply stream a mixed gas stream containing hydrogen gas as a majority component and other gases as minority components;
a pressure swing adsorption (PSA) assembly adapted to receive the mixed gas stream and to separate the mixed gas stream into a product hydrogen stream and a byproduct stream, wherein the product hydrogen stream contains at least one of a greater purity of hydrogen gas, a greater concentration of hydrogen gas, and a lower concentration of the other gases than the byproduct stream; and
a hydrogen source other than the hydrogen-producing region and the PSA assembly, fluidly connected to the PSA assembly and configured to provide hydrogen gas to the PSA assembly during startup of the PSA assembly.

F2. The hydrogen-generation assembly of paragraph F1, further comprising a controller adapted to at least partially concurrently startup the hydrogen-producing region and the PSA assembly from dormant, unheated states.

F3. The hydrogen-generation assembly of paragraph F2, wherein the controller is adapted to simultaneously initiate the delivery of hydrogen gas from the hydrogen source to the PSA assembly and the delivery of a combustible fuel stream to a heating assembly adapted to startup the hydrogen-producing region by heating the hydrogen-producing region to at least a minimum hydrogen-producing temperature.

F4. The hydrogen-generation assembly of paragraph F3, wherein the fuel stream includes hydrogen gas from the hydrogen source.

F5. The hydrogen-generation assembly of any of paragraphs F2-F3, wherein the fuel stream includes gas from the PSA assembly.

F6. The hydrogen-generation assembly of any of paragraphs F1-F4, wherein the hydrogen source includes at least one hydride bed containing hydrogen gas.

F7. The hydrogen-generation assembly of paragraph F5, wherein the hydride bed contains hydrogen gas previously produced by the hydrogen-producing region.

F8. The hydrogen-generation assembly of any of paragraphs F1-F4, wherein the hydrogen source includes a stored supply of hydrogen gas previously produced by the hydrogen-producing region.

F9. The hydrogen-generation assembly of any of paragraphs F1-F4, wherein the hydrogen source includes a stored supply of the mixed gas stream previously produced by the hydrogen-producing region.

F10. The hydrogen-generation assembly of any of paragraphs F1-F9 further comprising a controller configured to control operation of at least one of, and optionally both of, the fuel processing system and the PSA assembly.

F11. The hydrogen-generation assembly of claim F10, wherein the controller is configured to shutdown at least one of, and optionally both of, the fuel processing system and the PSA assembly to a dormant state.

F12. The hydrogen-generation assembly of paragraph F11, wherein the dormant state of the PSA assembly is a pressurized state.

F13. The hydrogen-generation assembly of paragraph F12, wherein the controller is adapted to periodically initiate delivery of hydrogen gas from the hydrogen source to the PSA assembly when the PSA assembly is in the dormant state to maintain the pressure of the PSA assembly above a minimum pressure.

F14. The hydrogen-generation assembly of any of paragraphs F10-F13, wherein the controller is adapted to periodically purge the PSA assembly when the PSA assembly is in the dormant state.

F15. The hydrogen-generation assembly of any of paragraphs F1-F14, wherein the feedstock supply stream includes an alcohol or a hydrocarbon.

F16. The hydrogen-generation assembly of any of paragraphs F1-F15, wherein the feedstock supply stream includes water.

F17. The hydrogen-generation assembly of any of paragraphs F1-F16, wherein the hydrogen-producing region is configured to produce the mixed gas stream by chemical reaction of the feedstock supply stream via at least one of a steam reforming region, a partial oxidation reaction, and an autothermal reaction.

F18. The hydrogen-generation assembly of any of paragraphs F1-F17, further comprising at least one separation assembly in addition to the PSA assembly, wherein the at least one separation assembly is adapted to receive at least a portion of the mixed gas stream or the product hydrogen stream and to increase the concentration of hydrogen gas therein.

F19. The hydrogen-generation assembly of paragraph F18, wherein the at least one separation assembly includes a methanation catalyst, a water-gas shift catalyst, a hydrogen-selective membrane, and catalyst adapted to partially oxide carbon monoxide to carbon dioxide.

Industrial Applicability

The methods for rapid startup of pressure swing adsorption assemblies and hydrogen-generation and/or fuel cell systems including the same are applicable in the gas generation and fuel cell fields, including such fields in which hydrogen gas is generated, purified, and/or consumed to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for starting up a hydrogen-generation assembly that includes a hydrogen-producing region (HPR) and a pressure swing adsorption (PSA) assembly, the hydrogen-producing region having HPR hydrogen-producing, HPR shutdown, HPR dormant, and HPR startup states, the PSA assembly having PSA hydrogen-purifying, PSA shutdown, PSA dormant, and PSA startup states, and the PSA assembly further having an internal pressure, the method comprising:
supplying a feedstock supply stream to the hydrogen-generation assembly while in the HPR hydrogen-producing state to produce a mixed gas stream containing hydrogen gas as a majority component and further containing other gases;
supplying the mixed gas stream to the PSA assembly while in the PSA hydrogen-purifying state to produce a product hydrogen stream having a greater concentration of hydrogen gas and/or a lower concentration of the other gases than the mixed gas stream;
utilizing a HPR shutdown sequence to transition the HPR from the HPR hydrogen-producing state to the HPR dormant state and utilizing a PSA shutdown sequence to transition the PSA assembly from the PSA hydrogen-purifying state to the PSA dormant state; and
utilizing a HPR startup sequence to transition the HPR from the HPR dormant state to the HPR hydrogen-producing state and utilizing a PSA startup sequence to transition the PSA assembly from the PSA dormant state to the PSA hydrogen-purifying state, wherein at least the PSA startup sequence includes supplying hydrogen gas to the PSA assembly from a hydrogen source, wherein the utilizing the PSA startup sequence includes utilizing the PSA startup sequence at least partially concurrently with the HPR startup sequence and further wherein the utilizing the PSA startup sequence begins after initiating and before completing the HPR startup sequence to transition the HPR from the HPR dormant state to the HPR hydrogen-producing state.

2. The method of claim 1 wherein the method includes starting the PSA startup sequence at the same time as the HPR startup sequence.

3. The method of claim 2, wherein the method includes starting the PSA startup sequence so that it completes at, or at substantially at, the same time as the HPR startup sequence.

4. The method of claim 1, wherein the hydrogen source includes a hydrogen storage device that includes a volume of hydrogen gas, and further wherein the method includes charging the hydrogen storage device with hydrogen gas by delivering at least a portion of the product hydrogen stream produced when the PSA assembly is in the PSA hydrogen-purifying state.

5. The method of claim 1, wherein the hydrogen source includes a hydrogen storage device that includes a volume of hydrogen gas, and further wherein the method includes charging the hydrogen storage device with hydrogen gas by delivering at least a portion of the mixed gas stream produced by the HPR when the HPR is in the hydrogen-producing state.

6. The method of claim 1, wherein the hydrogen source includes a hydrogen storage device that includes a volume of hydrogen gas, and further wherein the hydrogen storage device includes at least one hydride bed containing a hydrogen storage media, and further wherein the method includes sorbing at least a portion of the product hydrogen stream produced when the PSA assembly is in the PSA hydrogen-purifying state into the hydrogen storage media to charge the hydrogen source with hydrogen.

7. The method of claim 1, wherein the method includes producing hydrogen gas at the hydrogen source via a chemical reaction, and further wherein the chemical reaction is selected from the group comprising reacting water with aluminum/gallium, reacting water with magnesium, reacting methanol-water with hydrogen peroxide over a suitable catalyst, decomposing a chemical hydride, and decomposing sodium borohydride.

8. The method of claim 1, wherein the hydrogen source includes the HPR when the HPR is not in its hydrogen-producing state.

9. The method of claim 1, wherein the hydrogen source includes the HPR when the HPR is in its HPR startup state.

10. The method of claim 1, wherein the PSA shutdown sequence includes performing at least one purge cycle that involves supplying a purge gas stream to the PSA assembly to increase the internal pressure of the PSA assembly to a first pressure, maintaining the internal pressure at the first pressure for a first time period, decreasing the internal pressure of the PSA assembly to a second pressure by discharging gas within the PSA assembly to a byproduct stream, and maintaining the internal pressure at the second pressure for a second time period; wherein the PSA shutdown sequence further includes repeating the purge cycle; and further wherein at least one of the first time period and the second time period is less than the corresponding time periods associated with the PSA hydrogen-purifying state.

11. The method of claim 1, wherein, in the dormant state, the internal pressure within the PSA assembly is greater than atmospheric pressure.

12. The method of claim 11, wherein the method includes pressurizing the PSA assembly by charging the PSA assembly with hydrogen gas at least one of during and after the PSA shutdown sequence.

13. The method of claim 1, wherein the method further comprises periodically supplying hydrogen gas to the PSA assembly when the PSA assembly is in the dormant state.

14. The method of claim 13, wherein the periodically supplying includes supplying hydrogen gas to periodically purge the PSA assembly while maintaining the internal pressure at, or at least substantially at, atmospheric pressure.

15. The method of claim 13, wherein the periodically supplying includes supplying hydrogen gas to maintain the internal pressure within the PSA assembly above a threshold pressure that is greater than atmospheric pressure.

16. The method of claim 1, wherein the PSA startup sequence includes performing at least one purge cycle that involves supplying the product hydrogen stream to the PSA assembly to increase the internal pressure of the PSA assembly, maintaining the internal pressure for a time period, decreasing the internal pressure of the PSA assembly by discharging gas within the PSA assembly to a byproduct stream, maintaining the internal pressure for a further time period;
repeating the purge cycle at least once; and
supplying the product hydrogen stream to the PSA assembly to increase the internal pressure of the PSA assembly.

17. The method of claim 1, wherein the utilizing a HPR startup sequence, the utilizing the PSA startup sequence, and the supplying hydrogen gas occurs prior to the supplying the feedstock supply stream, the supplying the mixed gas stream, the utilizing the HPR shutdown sequence, and the utilizing the PSA shutdown sequence.

* * * * *